US012699440B2

(12) United States Patent
Hayashi et al.

(10) Patent No.: US 12,699,440 B2
(45) Date of Patent: Aug. 4, 2026

(54) CROSS-REALITY DEVICE, STORAGE MEDIUM, PROCESSING DEVICE, GENERATION METHOD, AND PROCESSING METHOD

(71) Applicant: KABUSHIKI KAISHA TOSHIBA, Tokyo (JP)

(72) Inventors: Kyotaro Hayashi, Yokohama (JP); Takanori Yoshii, Kawasaki (JP); Hiroaki Nakamura, Kawasaki (JP); Yoshiyuki Hirahara, Mishima (JP); Takehiro Kato, Yokohama (JP); Yasuo Namioka, Nerima (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 18/910,631

(22) Filed: Oct. 9, 2024

(65) Prior Publication Data

US 2025/0123678 A1　　Apr. 17, 2025

(30) Foreign Application Priority Data

Oct. 11, 2023　　(JP) ................................. 2023-176189

(51) Int. Cl.
　　*G06F 3/01*　　　　(2006.01)
　　*G06V 40/20*　　　(2022.01)
　　*G10L 15/22*　　　(2006.01)
(52) U.S. Cl.
　　CPC .............. *G06F 3/011* (2013.01); *G06F 3/017* (2013.01); *G06V 40/28* (2022.01); *G10L 15/22* (2013.01)

(58) Field of Classification Search
　　CPC ........ G06F 3/011; G06F 3/017; G06F 3/0304; G06V 40/28; G06V 20/20; G10L 15/22; G10L 2015/223
　　See application file for complete search history.

(56) References Cited

U.S. PATENT DOCUMENTS

| | | | |
|---|---|---|---|
| 9,135,503 B2 * | 9/2015 | Sundaresan | ............ G06V 40/28 |
| 9,874,977 B1 * | 1/2018 | Soyannwo | .............. G06F 3/042 |
| 9,972,133 B2 * | 5/2018 | Coleman | ............... G06T 19/006 |
| 12,524,067 B2 * | 1/2026 | Shinagawa | ............. G06F 3/011 |
| 2016/0231818 A1 * | 8/2016 | Zhang | ................... A63F 13/428 |
| 2017/0287218 A1 * | 10/2017 | Nuernberger | ....... G06F 3/04845 |
| 2018/0143693 A1 * | 5/2018 | Calabrese | ............ G06V 40/193 |
| 2019/0034733 A1 * | 1/2019 | Iwata | ..................... G06Q 10/20 |

(Continued)

FOREIGN PATENT DOCUMENTS

| JP | 2019-087262 A | 6/2019 |
|---|---|---|
| JP | 2020-154434 A | 9/2020 |

(Continued)

*Primary Examiner* — Grant Sitta
(74) *Attorney, Agent, or Firm* — Knobbe, Martens, Olson & Bear, LLP

(57) ABSTRACT

According to one embodiment, a cross-reality comprises an imaging device, a display device, and a processing device. The imaging device is configured to acquire an image. The display device is configured to display a virtual space. The processing device is configured to detect a hand of a human from the image. the processing device is configured to generate an object in the virtual space in response to a command input by the human, and change a position and a size of the generated object in accordance with a movement of the hand.

17 Claims, 28 Drawing Sheets

(56) References Cited

U.S. PATENT DOCUMENTS

| | | | |
|---|---|---|---|
| 2021/0158587 A1* | 5/2021 | Marchand | G06F 9/453 |
| 2021/0350588 A1* | 11/2021 | Tanida | G05B 19/4183 |
| 2022/0084279 A1* | 3/2022 | Lindmeier | G06F 3/04842 |
| 2022/0103748 A1* | 3/2022 | Canberk | G06V 40/107 |
| 2022/0137705 A1 | 5/2022 | Hashimoto et al. | |
| 2023/0085797 A1* | 3/2023 | Yoshii | G06Q 10/06398 |
| | | | 700/100 |
| 2023/0104917 A1 | 4/2023 | Yamaguchi et al. | |
| 2023/0326096 A1* | 10/2023 | Yoshii | G06T 11/00 |
| | | | 345/633 |

FOREIGN PATENT DOCUMENTS

| | | |
|---|---|---|
| JP | 2023-156237 A | 10/2023 |
| WO | WO 2020/217326 A1 | 10/2020 |
| WO | WO 2020/218533 A1 | 10/2020 |
| WO | WO 2021/176645 A1 | 9/2021 |

* cited by examiner

FIG. 9A
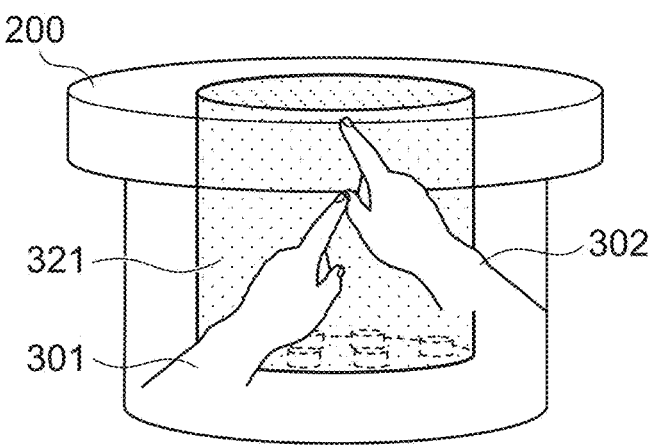
FIG. 9B
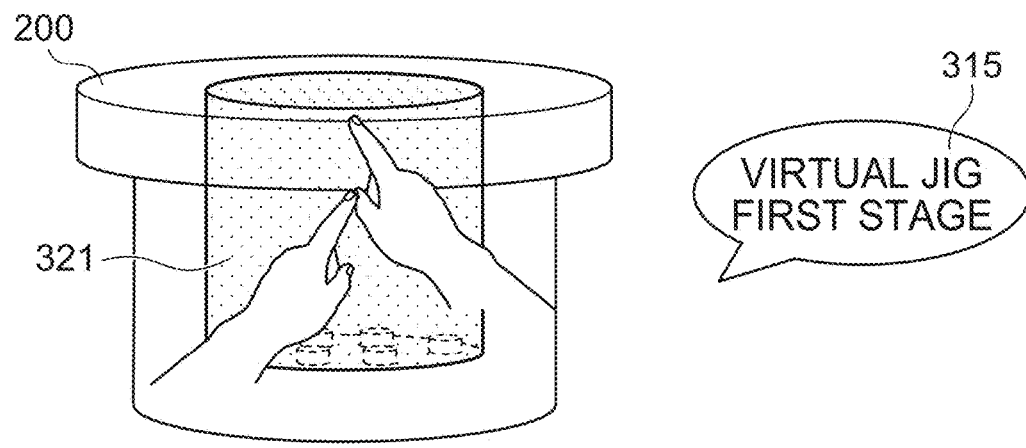
FIG. 9C

DISPLAY
TORQUE 50Nm

PLEASE
CHECK TOOL

CROSS-REALITY DEVICE, STORAGE MEDIUM, PROCESSING DEVICE, GENERATION METHOD, AND PROCESSING METHOD

CROSS-REFERENCE TO RELATED APPLICATIONS

This application is based upon and claims the benefit of priority from Japanese Patent Application No. 2023-176189, filed on Oct. 11, 2023; the entire contents of which are incorporated herein by reference.

FIELD

Embodiments of the present invention generally relate to a cross-reality device, a storage medium, a processing device, a generation method, and a processing method.

BACKGROUND

In recent years, cross-reality (XR) devices have sometimes been used to perform tasks smoothly. XR devices are a general term for mixed reality (MR) devices, virtual reality (VR) devices, augmented reality (AR) devices, Substitutional reality (SR) devices, etc. The display of virtual objects on XR devices can assist in tasks in a variety of ways. Regarding such XR devices, there is a need for a technology that can more easily prepare these virtual objects.

BRIEF DESCRIPTION OF THE DRAWINGS

FIGS. 9A to 9C are schematic views for explaining the embodiment of the present invention;

DETAILED DESCRIPTION

Figure 1:
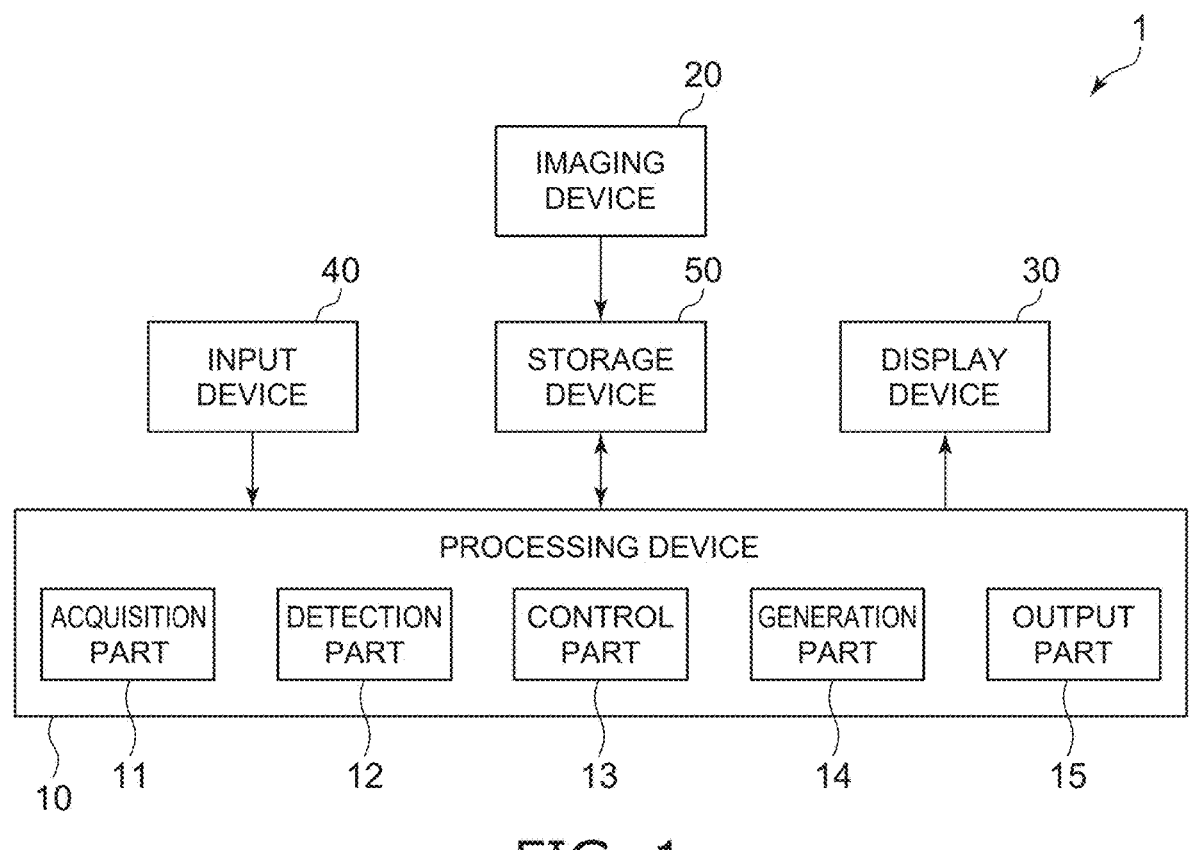
FIG. 1 is a schematic diagram illustrating a configuration of a processing system according to an embodiment.

According to one embodiment, a cross-reality comprises an imaging device, a display device, and a processing device. The imaging device is configured to acquire an image. The display device is configured to display a virtual space. The processing device is configured to detect a hand of a human from the image. the processing device is configured to generate an object in the virtual space in response to a command input by the human, and change a position and a size of the generated object in accordance with a movement of the hand.

Various embodiments will be described hereinafter with reference to the accompanying drawings. The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions. In the specification and drawings, components similar to those described or illustrated in a drawing thereinabove are marked with like reference numerals, and a detailed description is omitted as appropriate.

An embodiment of the present invention is used when a user creates an object displayed on a virtual space. By using the embodiments, the user can more easily create virtual objects.

FIG. 1 is a schematic diagram illustrating a configuration of the processing system according to the embodiment.

The processing system 1 according to the embodiment includes a processing device 10, an imaging device 20, a display device 30, an input device 40, and a storage device 50.

The processing device 10 executes various processes related to generation of virtual objects. For example, the processing device 10 detects human hands in images, detects commands, generates virtual objects, stores virtual objects, etc. The processing device 10 includes a central processing device (CPU), a memory for storing or executing programs, various interfaces, etc.

The imaging device 20 images a part of the body of a human (a user) and the surroundings. The imaging device 20 continuously acquires images and stores them in the storage device 50. The imaging device 20 includes, for example, a camera capable of acquiring RGB images. It is preferable that the camera can acquire depth information in addition to RGB images. The display device 30 shows the user a virtual space different from the real world. The display device 30 includes a monitor or projector.

The input device 40 is used for the user to input data to the processing device 10. The input device 40 includes a microphone. A mouse, keyboard, touch pad, etc. may be used as the input device 40. In addition to the input device 40, data may be input to the processing device 10 using a hand gesture, a virtual input device, etc.

The storage device 50 stores data necessary for the processing of the processing device 10, data obtained by the processing of the processing device 10, etc. The storage device 50 includes, for example, one or more selected from a Hard Disk Drive (HDD) and a Solid State Drive (SSD).

The processing device 10 is electrically connected to the imaging device 20, the display device 30, the input device 40, and the storage device 50. The processing device 10 may be connected to the imaging device 20, the display device 30, the input device 40, and the storage device 50 by wired communication or wireless communication. A network HDD (NAS) or similar devices may be used as the storage device 50, and the processing device 10 and the storage device 50 may be connected via a network.

Specifically, as shown in FIG. 1, the processing device 10 has functions as an acquisition part 11, a detection part 12, a control part 13, a generation part 14, and an output part 15. The acquisition part 11 acquires images captured by the imaging device 20, data input by the input device 40, etc. in real time.

The detection part 12 detects the user's hand in the image. The detection part 12 measures the three-dimensional position of each point of the detected hand. Specifically, the hand includes multiple joints, such as DIP joints, PIP joints, MP joints, CM joints, etc. The position of any of these joints is used as the position of the hand. The position of the center of gravity of the multiple joints May be used as the position of the hand. Alternatively, the overall center position of the hand may be used as the position of the hand.

The detection part 12 repeatedly detects hands in the continuously acquired images and executes hand tracking. Further, the detection part 12 detects hand gestures from time-series changes in the position of the detected hand. For example, the detection part 12 calculates the similarity between the changes in the hand position and the hand movements of each predefined hand gesture. When the similarity for any one of the hand gestures exceeds a preset threshold, the detection part 12 determines that the user's hand movement indicates that hand gesture.

When voice data is acquired by the acquisition part 11, the detection part 12 detects a voice command from the voice. For example, the detection part 12 executes voice recognition and converts the user's utterance into a character string. The detection part 12 determines whether the utterance includes a string of any predefined voice command. When the utterance includes a string of any voice command, the detection part 12 determines that the user is speaking the voice command.

Hand gestures and voice commands are each a kind of command. A definition file in which multiple commands and the functions of each command are defined is prepared in advance. The control part 13 transmits an instruction to the generation part 14 so that it executes the function corresponding to the detected command (hand gesture or voice command).

The generation part 14 generates virtual objects, changes the position, size, shape, etc. of objects according to instructions. The output part 15 outputs a video signal of the virtual space including generated or modified objects to the display device 30. The display device 30 displays the virtual space based on the input video signal.

Hereinafter, details of embodiments of the present invention will be described with reference to specific examples. Here, an example in which the processing system 1 is implemented as an MR device will be described. In MR devices, the virtual space is superimposed on the real space. The user can interact with objects displayed in the virtual space.

Figure 2:
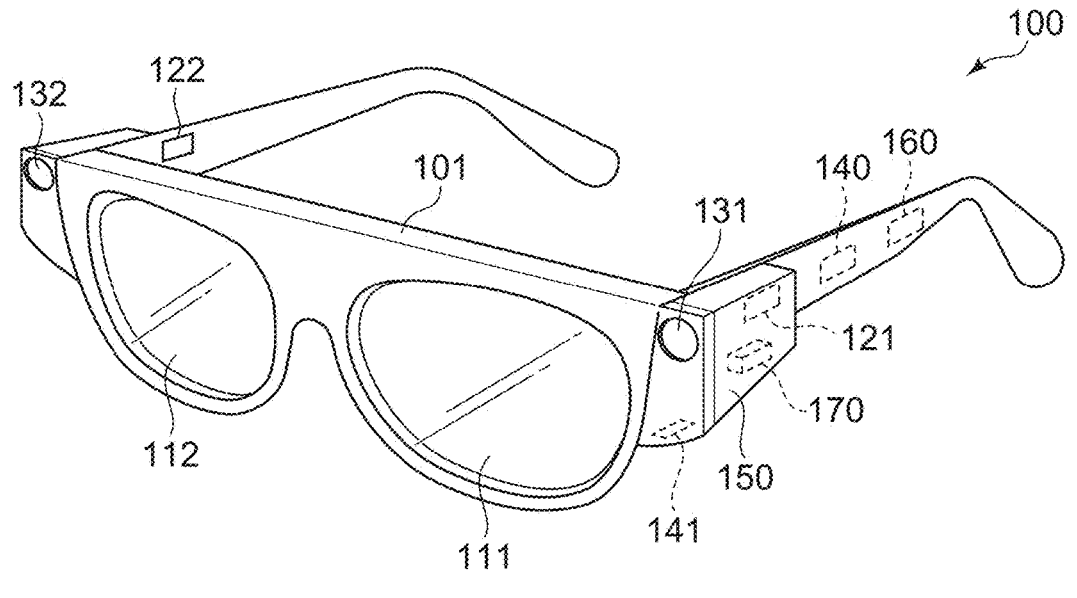
FIG. 2 is a schematic view illustrating a mixed reality device according to the embodiment.

FIG. 2 is a schematic view illustrating a mixed reality device according to the embodiment.

The processing system 1 shown in FIG. 1 is implemented, for example, as a mixed reality (MR) device. The MR device 100 shown in FIG. 2 includes a frame 101, a lens 111, a lens 112, a projection device 121, a projection device 122, an image camera 131, a depth camera 132, a sensor 140, a microphone 141, a processing device 150, a battery 160, and a storage device 170.

The processing device 150 is an example of the processing device 10. The projection device 121 and the projection device 122 are examples of the display device 30. The image camera 131 and the depth camera 132 are examples of the imaging device 20. The microphone 141 is an example of the input device 40. The storage device 170 is an example of the storage device 50.

In the illustrated example, the MR device 100 is a binocular-type head-mounted display. Two lenses 111 and 112 are embedded in the frame 101. The projection devices 121 and 122 project information onto lenses 111 and 112, respectively.

The projection device 121 and the projection device 122 display the detection result of the user's body, a virtual object, etc. on the lens 111 and the lens 112. The user is the wearer of the MR device 100. Only one of the projection device 121 and the projection device 122 may be provided, and information may be displayed on only one of the lens 111 and the lens 112.

The lens 111 and the lens 112 are transparent. The user can see the real-space environment through the lens 111 and the lens 112. The user can also see the information projected onto the lens 111 and the lens 112 by the projection device 121 and the projection device 122. The projections by the projection device 121 and the projection device 122 display information overlaid on the real space.

The image camera 131 detects visible light and acquires a two-dimensional image. The depth camera 132 emits infrared light and acquires a depth image based on the reflected infrared light. The sensor 140 is a 6-axis detection sensor, and can detect 3-axis angular velocity and 3-axis acceleration. The microphone 141 accepts voice input.

The processing device 150 controls each element of the MR device 100. For example, the processing device 150 controls the display by the projection device 121 and the projection device 122. The processing device 150 detects the movement of the field of view based on the detection result by the sensor 140. The processing device 150 changes the display by the projection device 121 and the projection device 122 in response to the movement of the field of view. In addition, the processing device 150 can perform various processes using data obtained from the image camera 131 and the depth camera 132, the data of the storage device 170, etc.

The battery 160 supplies the power necessary for operation to each element of the MR device 100. The storage device 170 stores data necessary for the processing of the processing device 150, data obtained by the processing of the processing device 150, etc. The storage device 170 may be provided outside the MR device 100 and may communicate with the processing device 150.

Not limited to the illustrated example, the MR device according to the embodiment may be a monocular-type head-mounted display. The MR device may be a glasses-type as illustrated, or may be a helmet type.

Figure 3:
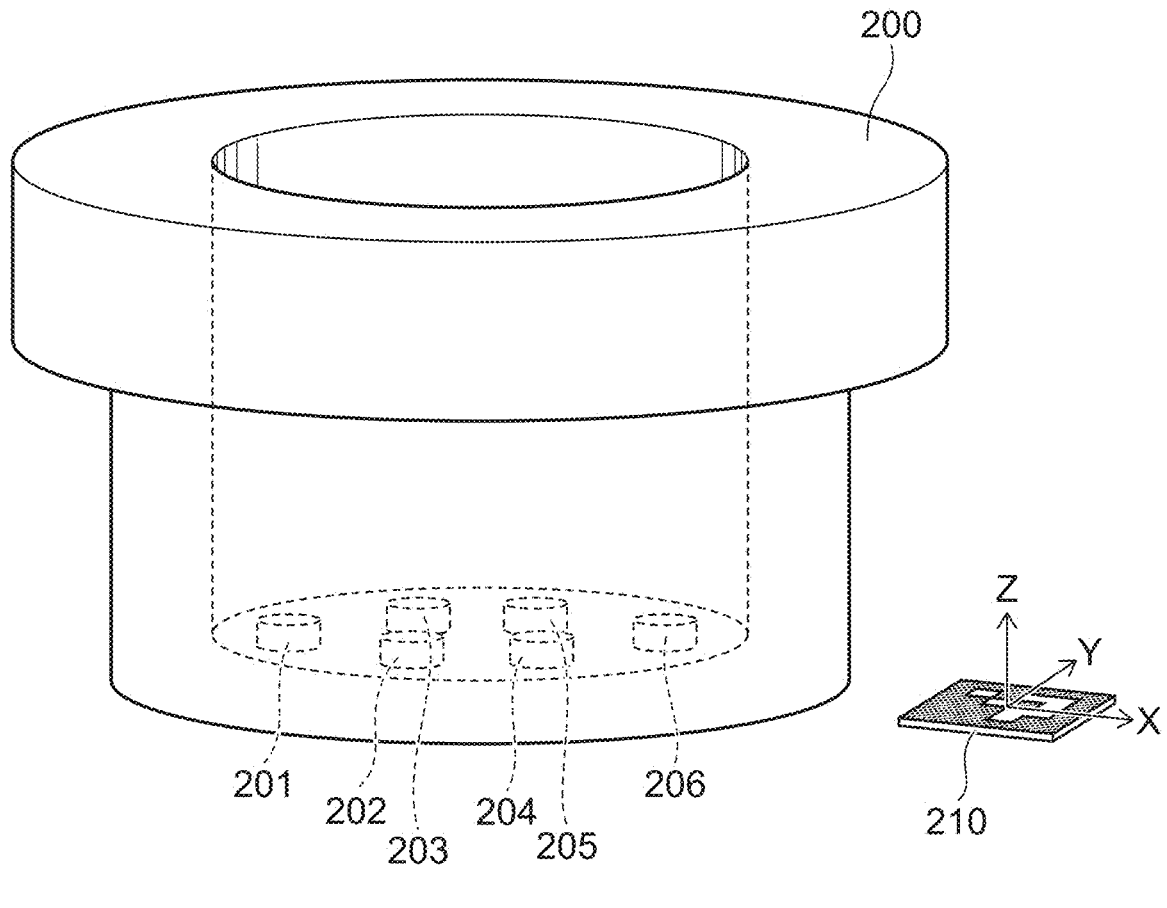
FIG. 3 is a schematic view illustrating a state of the real space.

FIG. 3 is a schematic view illustrating a state of the real space.

In the real space, there is an article 200 shown in FIG. 3. The article 200 is a cylindrical member. The inside of the article 200 is a cavity, and there are fastening locations 201 to 206 at the bottom of the cavity. In this example, a screw-tightening task is performed on the article 200. In the fastening task, a screw is tightened into each of the fastening locations 201 to 206 using a wrench and an extension bar. During the fastening task, the MR device is used to assist in the task. For example, the virtual object shows the appropriate orientation of the tool, the fastening position, the position where the hand is located in the fastening, etc.

A marker 210 is provided in the vicinity of the article 200 to be worked. In the illustrated example, the marker 210 is an AR marker. As will be described later, the marker 210 is provided for setting an origin of the three-dimensional coordinate system. Instead of the AR marker, a one-dimensional code (barcode), a two-dimensional code (QR code (registered trademark)), etc. may be used as the marker 210. Alternatively, instead of the marker, the origin may be indicated by a hand gesture. The processing device 150 sets a three-dimensional coordinate system of the virtual space based on multiple points indicated by the hand gesture.

Figure 4:
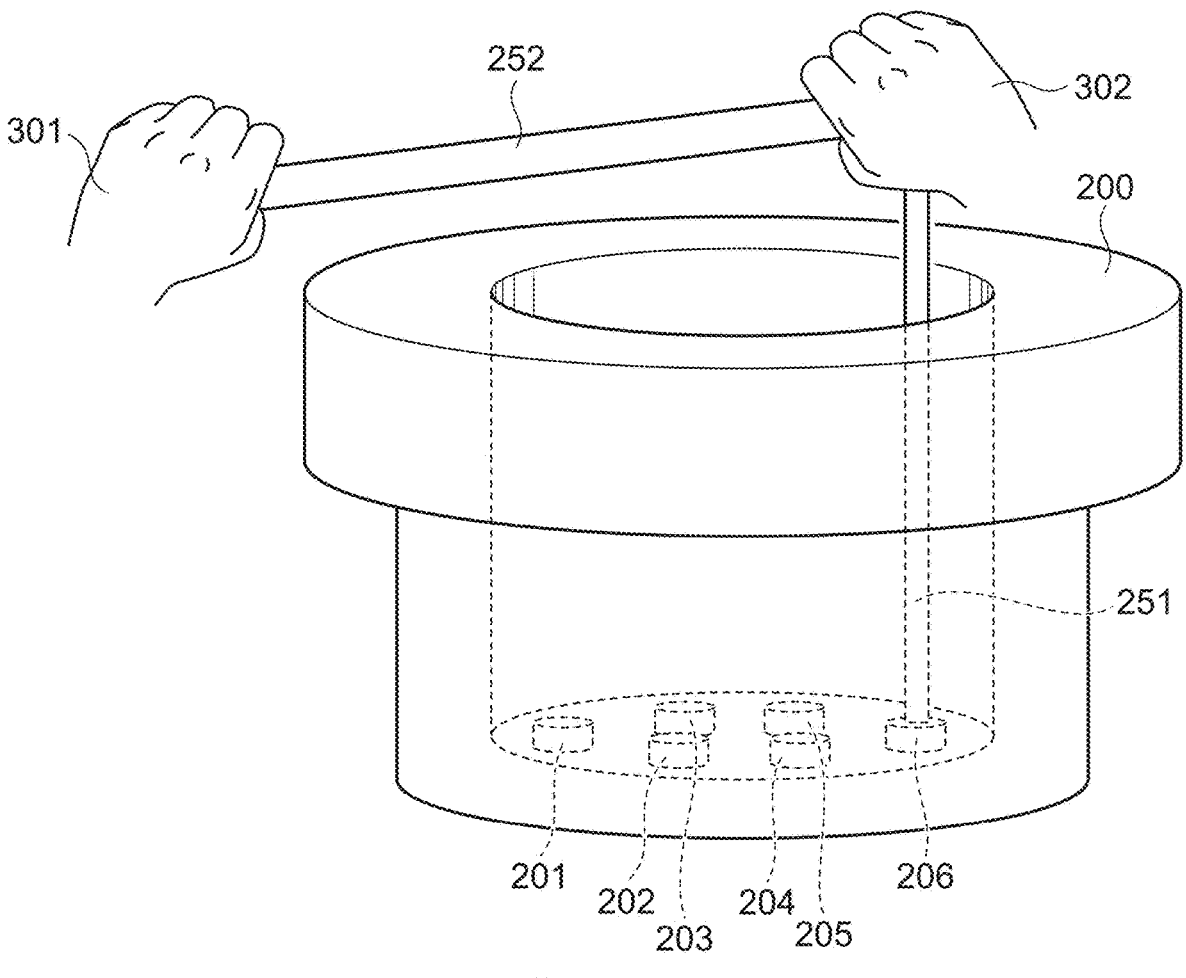
FIG. 4 is a schematic view illustrating a state during a task.

FIG. 4 is a schematic view illustrating a state during the task.

When a screw is tightened to the article 200, the worker places a screw at any one of the fastening locations. The worker fits one end of the extension bar 251 into the screw. The worker fits the wrench 252 onto the other end of the extension bar 251. As shown in FIG. 4, the worker holds both ends of the wrench 252 with both hands. In this state, the worker tightens the screw into the fastening location by turning the wrench 252 and rotating the extension bar 251.

When the task involving screws is performed, the tool is preferably used in a suitable orientation. When the tool is used in an inappropriate orientation, it may damage the article. The Worker may also be injured. Here, an example in which a virtual jig is provided so that the worker uses the tool in an appropriate orientation will be described.

First, when preparing the virtual object, the position of the article 200 with respect to the marker 210 is adjusted. The positional relationship between the article 200 and the marker 210 when preparing the object is adjusted so that it is the same as the positional relationship between the article 200 and the marker 210 when the task is performed. Thereby, the prepared object can be superimposed on the article 200 at an appropriate position during the task.

FIGS. 5A to 5C, FIGS. 6A to 6C, FIGS. 7A to 7C, FIGS. 8A to 8C, FIGS. 9A to 9C, FIG. 10A, FIG. 10B, FIGS. 11A to 11C, FIG. 12A, and FIG. 12B are schematic views for explaining the embodiment of the present invention.

Figure 5A:
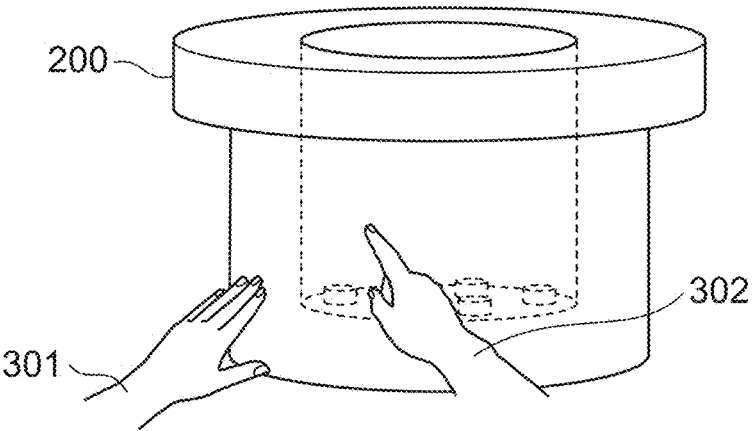
FIGS. 5A to 5C are schematic views for explaining the embodiment of the present invention.
Figure 5B:
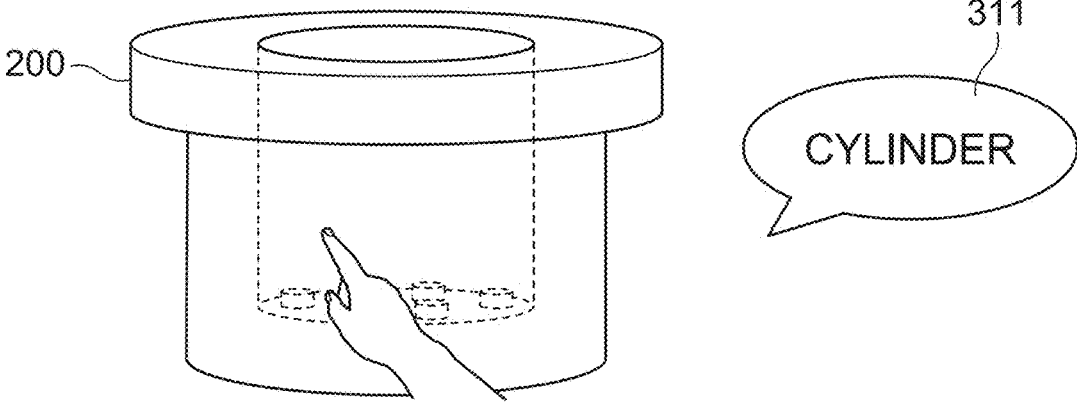
Figure 5C:
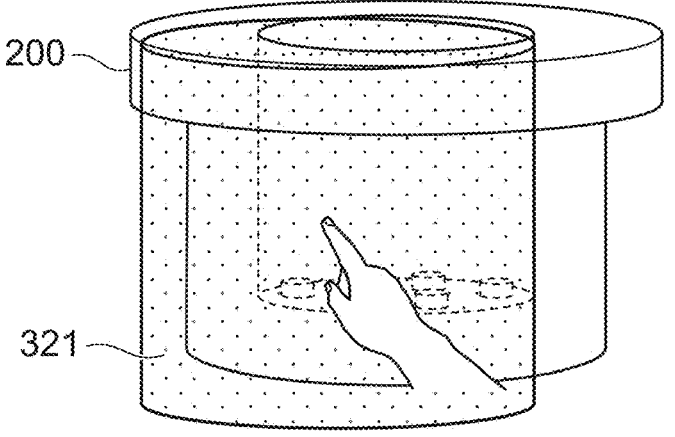

A specific example of the embodiment will be described with reference to the figures. First, the processing device 10 detects the user's left hand 301 and right hand 302 by hand tracking. The user is the wearer of the MR device. As shown in FIG. 5A, the user points to a position where the object will be generated. At this time, the position of the fingertip is measured by the processing device 10. Next, as shown in FIG. 5B, the user utters the shape of the object to be generated. In the storage device 50, the shape is registered in advance as a voice command. The processing device 10 detects the voice command contained in utterance 311. As shown in FIG. 5C, the processing device 10 generates and displays an object 321 having a shape corresponding to the voice command.

Figure 6A:
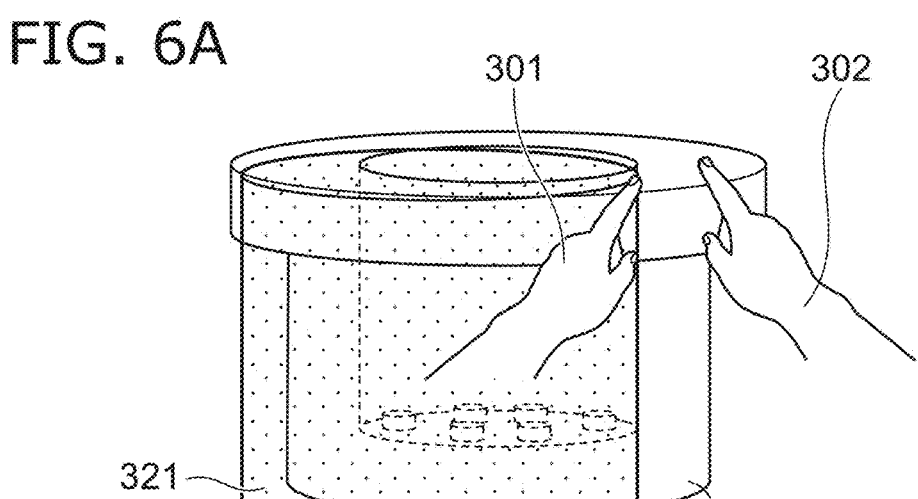
FIGS. 6A to 6C are schematic views for explaining the embodiment of the present invention.
Figure 6B:
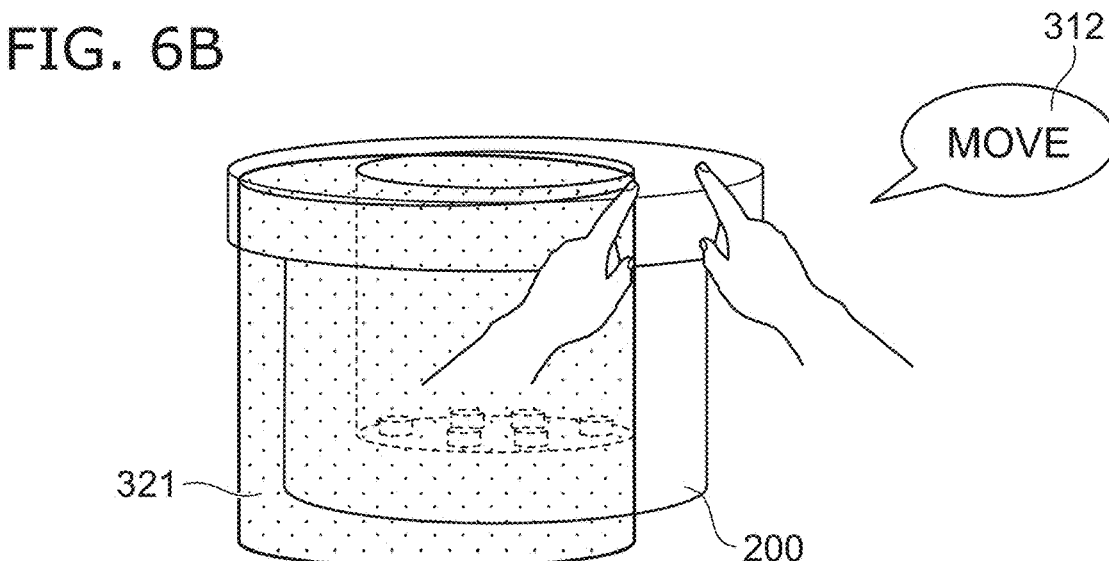
Figure 6C:
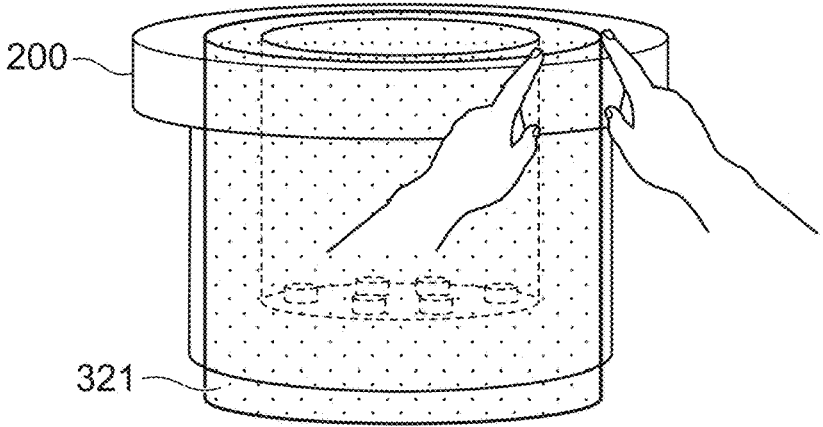

The user then adjusts the position of the generated object 321. First, as shown in FIG. 6A, the user touches a portion of object 321 with the finger of one hand. The user points to the destination of the portion of the object 321 with the finger of the other hand. The user's fingers specify the amount of movement and the direction of movement of the object 321. In this state, as shown in FIG. 6B, the user utters a voice command to move the object. Based on the fingertip detection result and the voice command detection result included in the utterance 312, the processing device 10 moves the object 321 as shown in FIG. 6C. When it is not necessary to move the object 321 from the generated position, the movement process may be omitted.

Figure 7A:
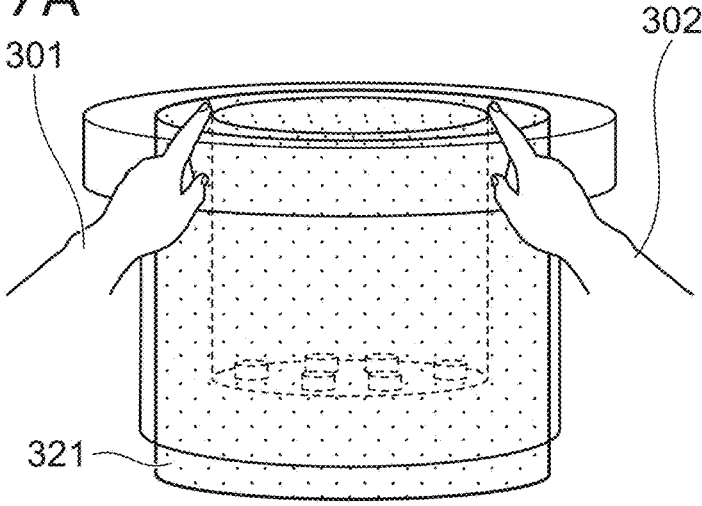
FIGS. 7A to 7C are schematic views for explaining the embodiment of the present invention.
Figure 7B:
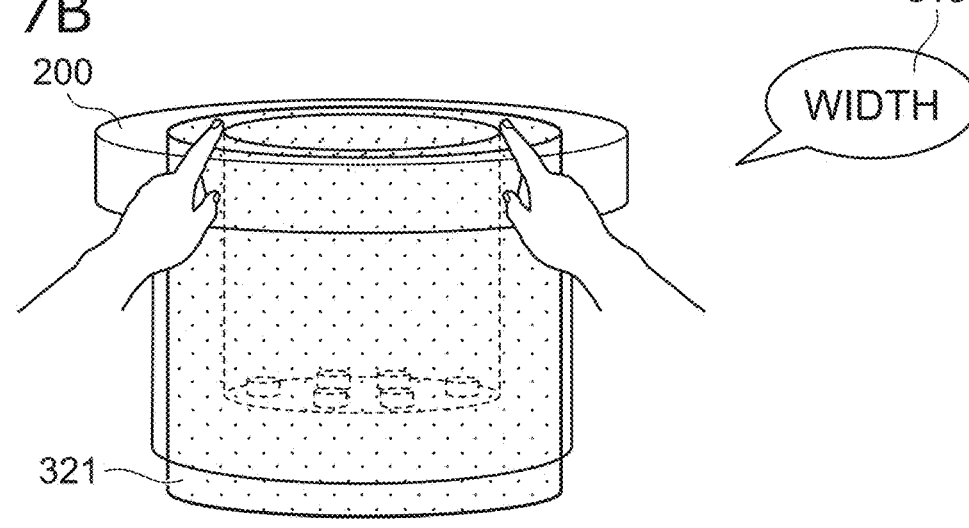
Figure 7C:
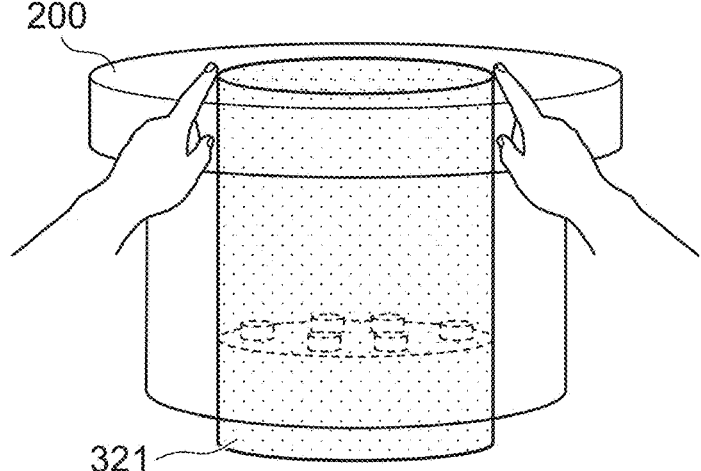

The user then adjusts the size of the object 321. First, as shown in FIG. 7A, the user shows the width of the object 321 with the fingers of both hands. As shown in FIG. 7B, the user specifies the dimensions to be adjusted by utterance 313. As shown in FIG. 7C, the processing device 10 changes the width of the object 321 based on the detection result of the fingertips and the detection result of the voice command included in the utterance 313. In the illustrated example, the cylindrical object 321 is set to change its depth as the width changes. Alternatively, the width and depth may be individually adjustable.

Figure 8A:
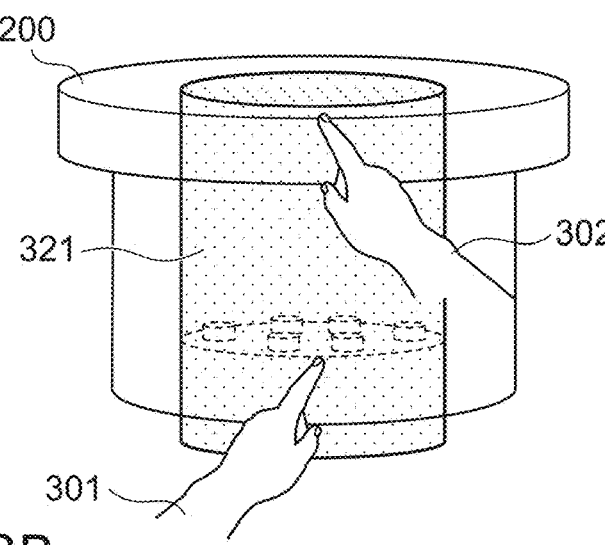
FIGS. 8A to 8C are schematic views for explaining the embodiment of the present invention.
Figure 8B:
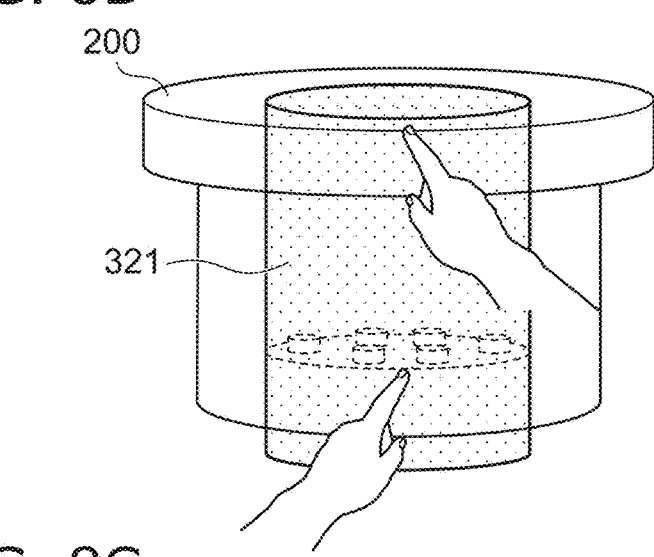
Figure 8C:
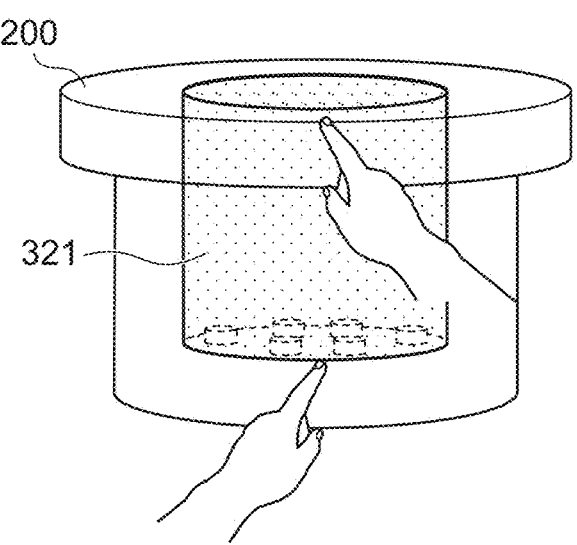

After the width is adjusted, as shown in FIG. 8A, the user shows the height of the object 321 with the fingers of both hands. As shown in FIG. 8B, the user specifies the dimension to be adjusted by utterance 314. As shown in FIG. 8C, the processing device 10 changes the height of the object 321 based on the detection result of the fingertips and the detection result of the voice command included in the utterance 314.

Attributes can also be assigned to the generated object. As shown in FIG. 9A, the user shows the range to which the attribute will be assigned in the object using the fingers of both hands. In the illustrated example, the range in the height direction between the fingers of the left hand 301 and the right hand 302 is shown. As shown in FIG. 9B, the user utters a voice command corresponding to the attribute to be assigned. The processing device 10 detects the voice command included in utterance 315. As shown in FIG. 9C, the processing device 10 assigns the attribute of "first stage of jig" to the range 321a of the object 321 shown by the fingers of both hands.

Figure 10A:
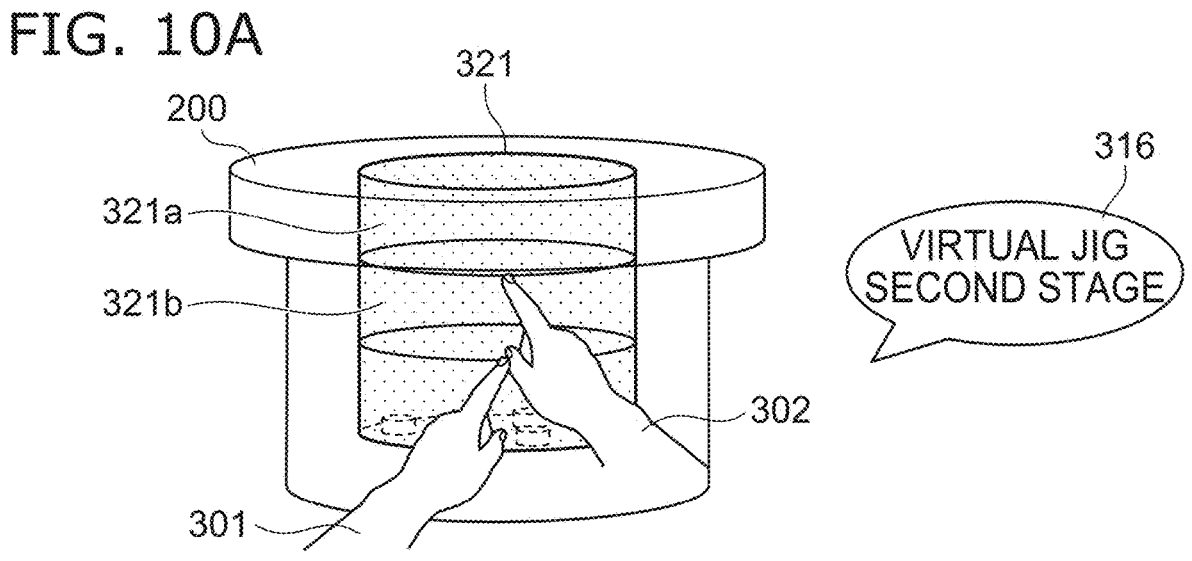
FIGS. 10A and 10B are schematic views for explaining the embodiment of the present invention.
Figure 10B:
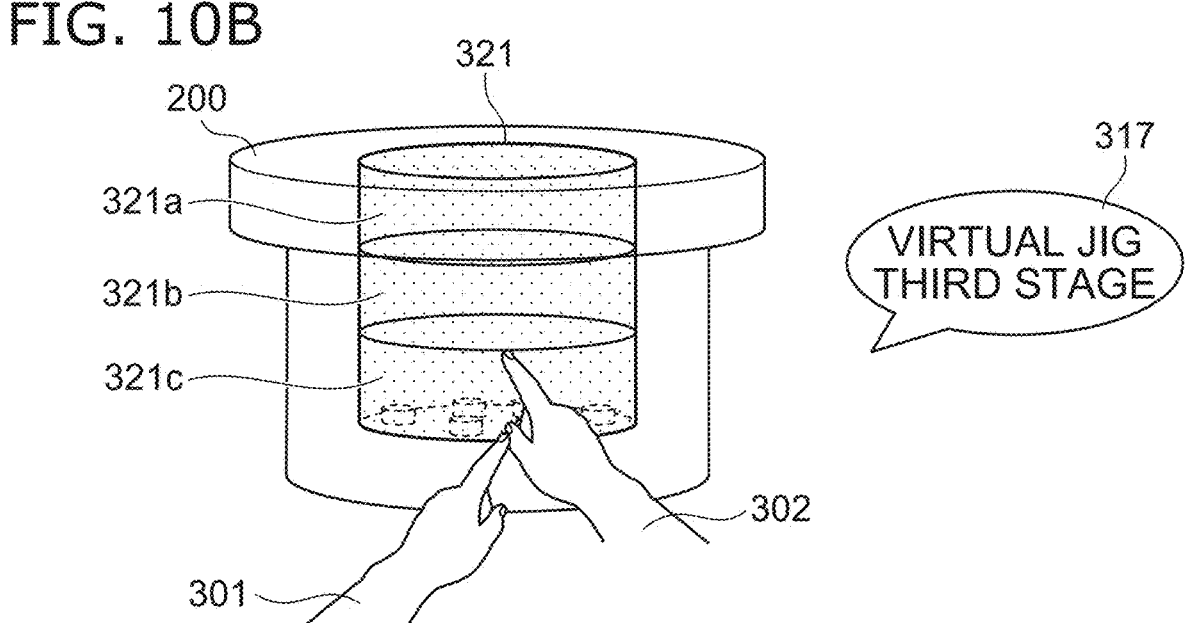

The user can further assign attributes to the object 321 by the same method as shown in FIGS. 9A to 9C. For example, as shown in FIG. 10A, the user points to a range 321b located below the range 321a. The user assigns the attribute of "second stage of jig" to the range 321b by utterance 316. As shown in FIG. 10B, the user points to a range 321c located below the range 321b. The user assigns the attribute of "third stage of jig" to the range 321c by utterance 317.

In this example, the virtual "jig" represents an area where the tool should not enter during the task. The jig is positioned so that the tool and the jig come into contact if the tool is used in an inappropriate orientation. During the actual task, the processing device 10 calculates the distance between the tool and the object to which the attribute of "jig" is assigned. When the distance is less than a predetermined threshold and it is determined that the tool is in contact with the jig, the processing device 10 issues an alert.

Also, the deeper the tool is inserted into the cavity of article 200 in the wrong orientation, the stronger the alert the processing device 10 will issue. That is, the alert triggered when the tool comes into contact with the first stage of the jig, the alert triggered when the tool comes into contact with the second stage of the jig, and the alert triggered when the tool comes into contact with the third stage of the jig are different from each other. The alert triggered when the tool comes into contact with the second stage of the jig is stronger than the alert triggered when the tool comes into contact with the first stage of the jig, and weaker than the alert triggered when the tool comes into contact with the third stage of the jig. For example, the processing device 10 outputs a larger message, a louder warning sound, or a darker warning color as the tool is inserted deeper in the wrong orientation.

Figure 11A:
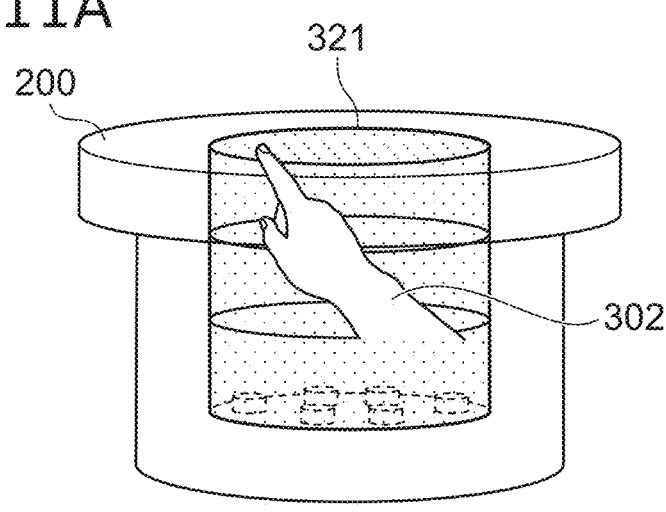
FIGS. 11A to 11C are schematic views for explaining the embodiment of the present invention.
Figure 11B:
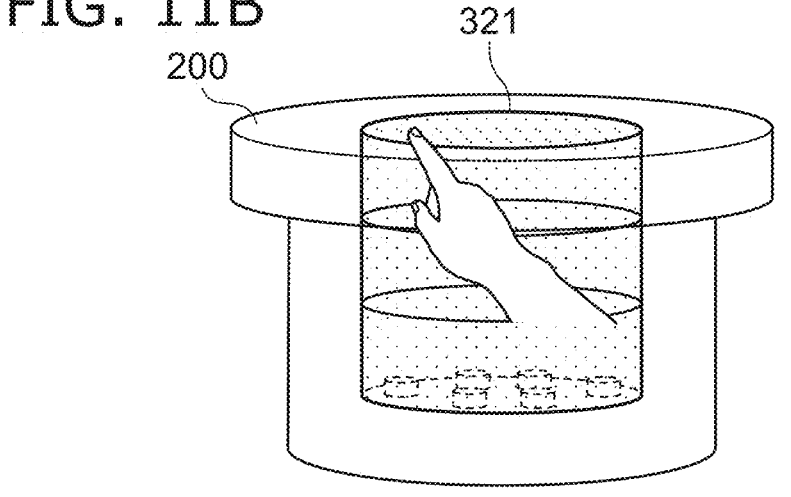
Figure 11C:
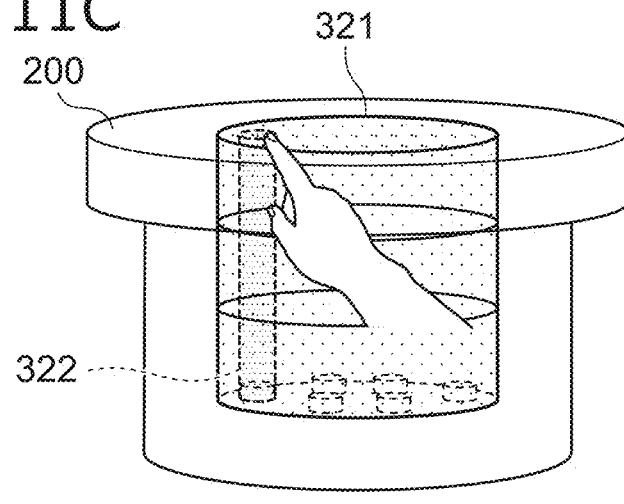

The shape of the object 321 may be altered. For example, the user forms a hole in the object 321 to allow the extension bar 251 to pass through. First, as shown in FIG. 11A, the user points with a finger to a position where a hole will be formed. As shown in FIG. 11B, the user utters a voice command to form a hole. The processing device 10 detects the voice command included in utterance 318. As shown in FIG. 11C, the processing device 10 forms a hole 322 in the object 321 in response to the voice command.

When adjusting the size of hole 322, the user selects the hole 322 with a finger or a voice command. By the same method as shown in FIGS. 6A to 8C, the user can adjust the position, width, depth, and height of the hole 322.

When the shape, position, size, and attribute of the object are set, the user stores the generated object. For example, the user points to the object and utters a voice command for saving. The processing device 10 detects the voice command included in the utterance and stores the data of the pointed object.

Figure 12A:
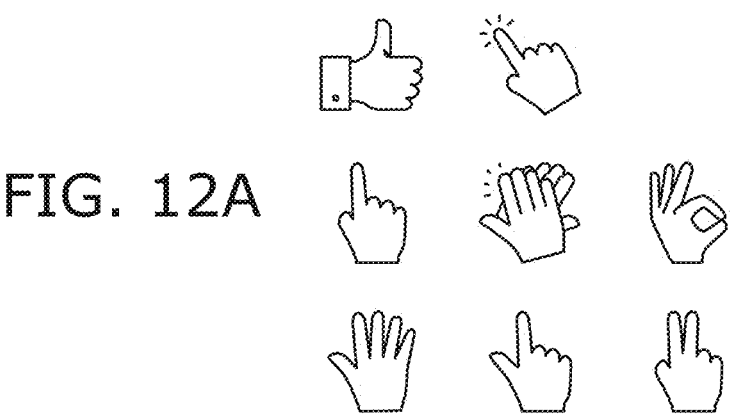
FIGS. 12A and 12B are schematic views for explaining the embodiment of the present invention.
Figure 12B:
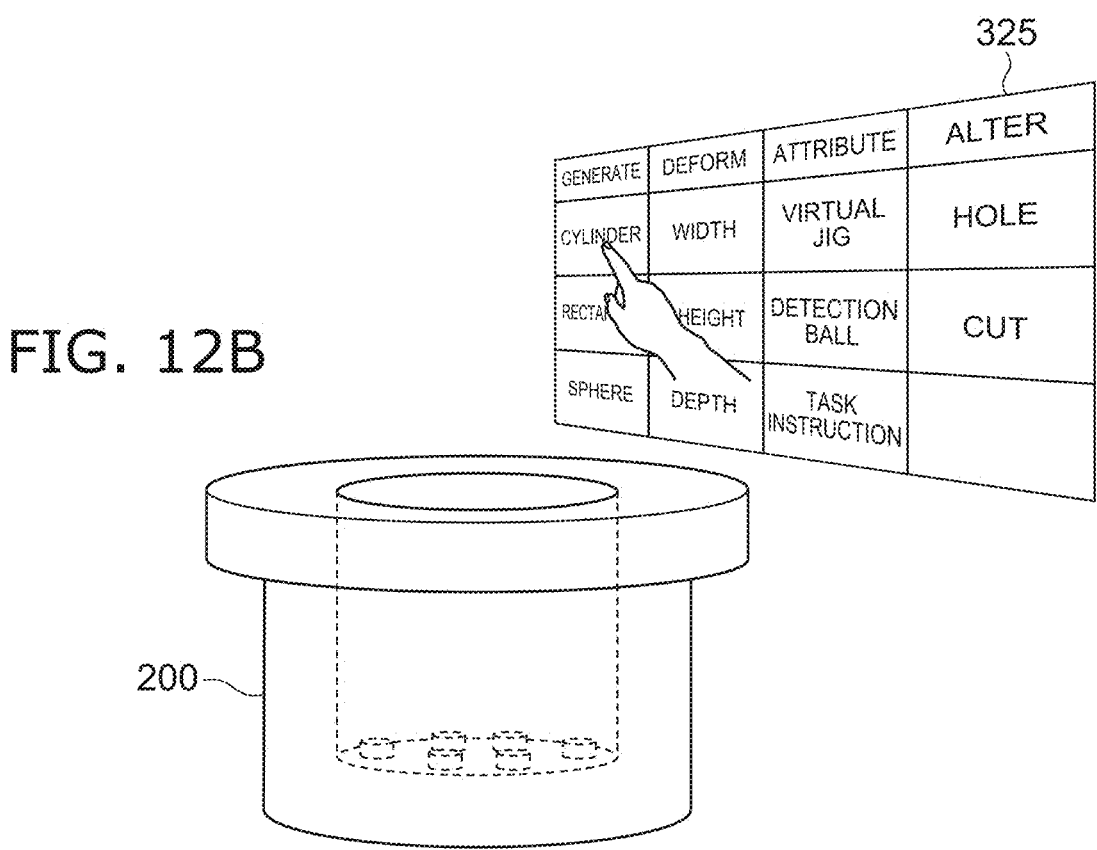

In addition to the voice, various hand gestures may be used as commands for generating or changing virtual objects, as shown in FIG. 12A. Alternatively, as shown in FIG. 12B, a panel 325 that is a virtual input device may be displayed. The user selects (touches) a command displayed on the panel 325. The processing device 10 detects the selected command by hand tracking. The processing device 10 executes processing corresponding to the command.

The order in which the object's position, size, and attributes are set can be changed appropriately. When the position or size need not be adjusted, or when an attribute need not be set, those steps may be omitted.

As described above, the processing device 10 can generate an object in the virtual space in response to the input of a command by the user. In addition, the position and size of the object can be adjusted appropriately according to the command and hand movement. Further, the processing device 10 can accept setting attributes to the object. The processing device 10 associates the position, size, and attributes with an ID for specifying each object and stores them.

FIGS. 13A to 13C, FIGS. 14A to 14C, FIG. 15A, FIG. 15B, FIGS. 16A to 16C, FIGS. 17A to 17C, FIG. 18, FIG.

Figure 19A:
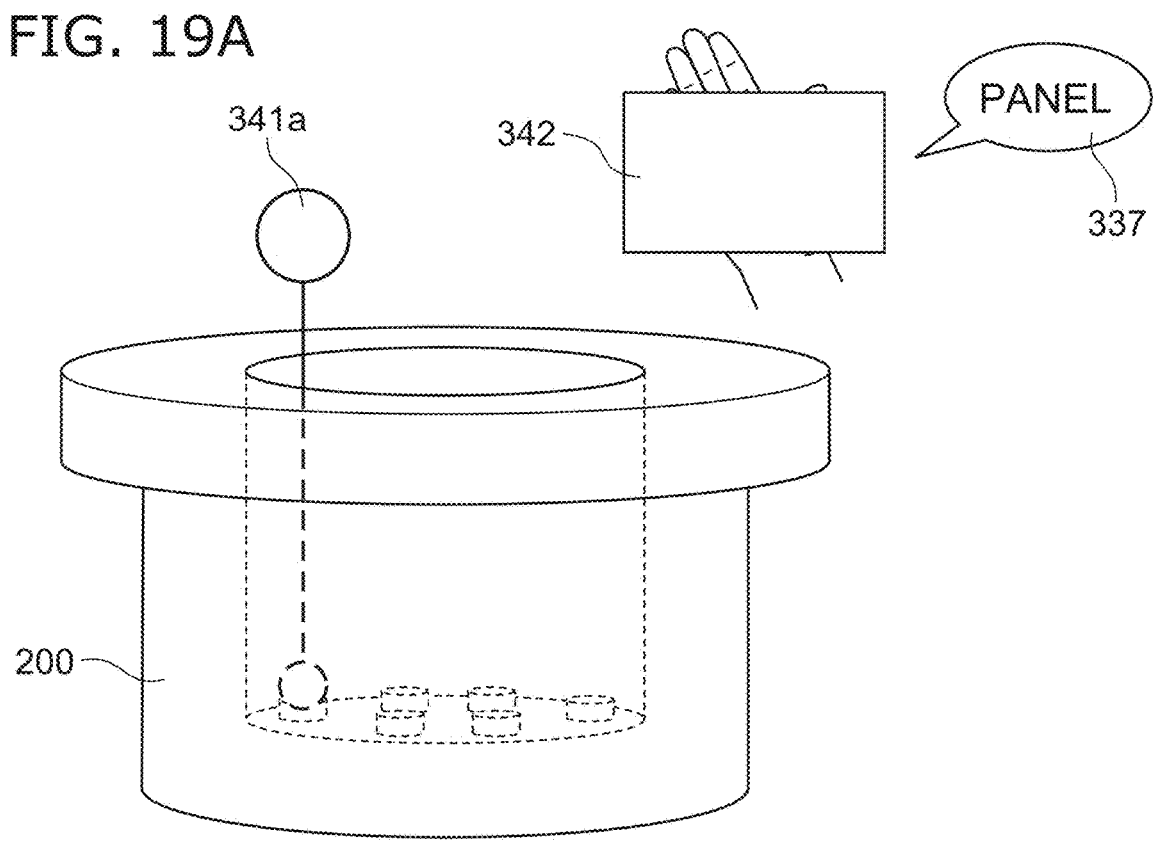
FIGS. 19A and 19B are schematic views for explaining the embodiment of the present invention.
Figure 19B:
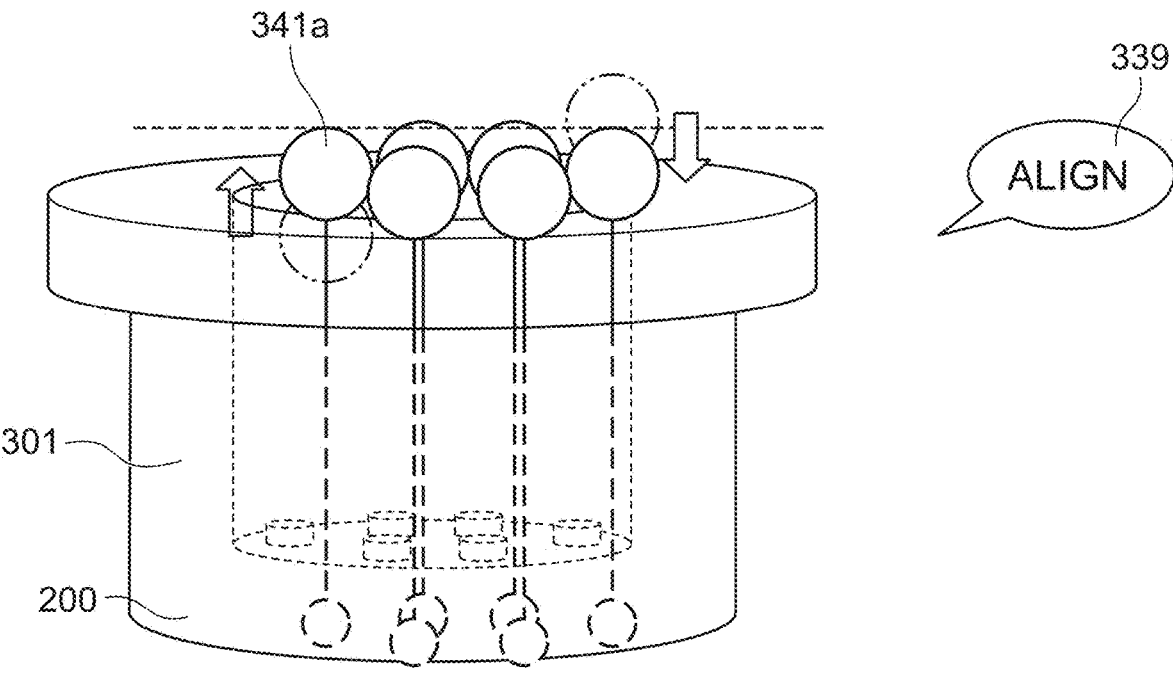

19A, and FIG. 19B are schematic views for explaining the embodiment of the present invention.

Figure 13A:
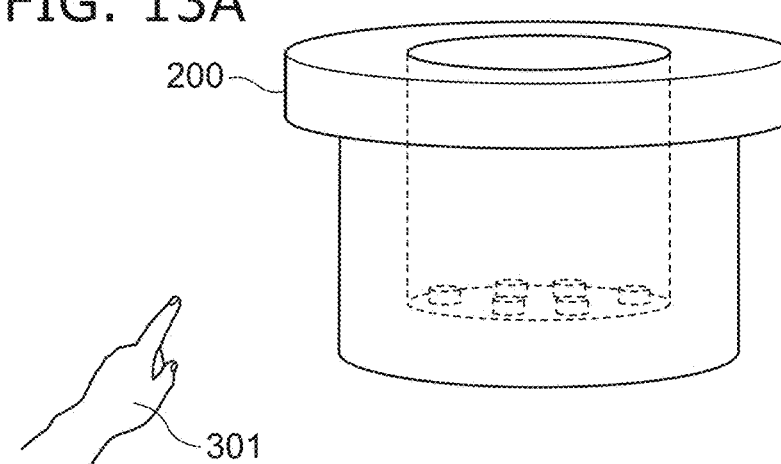
FIGS. 13A to 13C are schematic views for explaining the embodiment of the present invention.
Figure 13A:
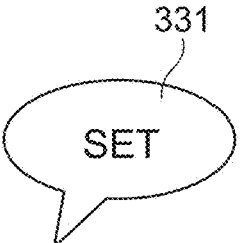

In FIGS. 5A to 11C, an example in which an object is generated to indicate an area where a tool should not enter is described. FIG. 13A and subsequent figures describe another example. In the example, a virtual object for indicating a position in which a hand should be located during a task is generated.

Figure 13B:
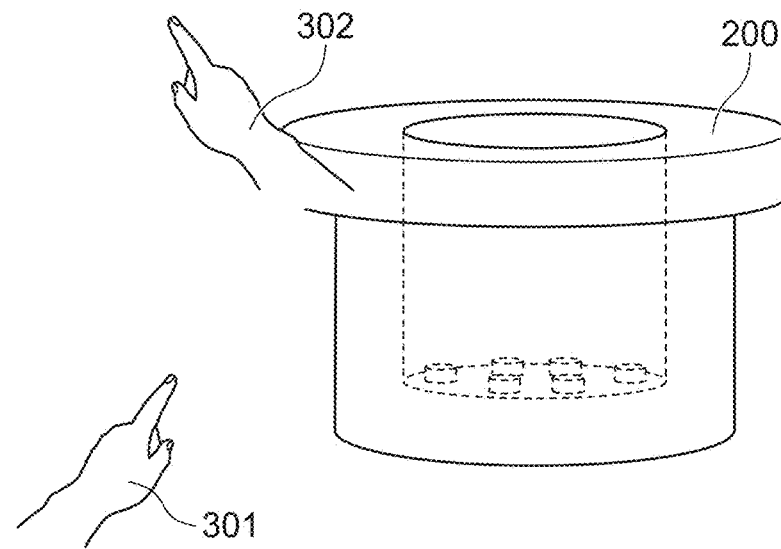
Figure 13B:
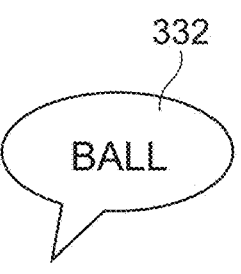
Figure 13C:
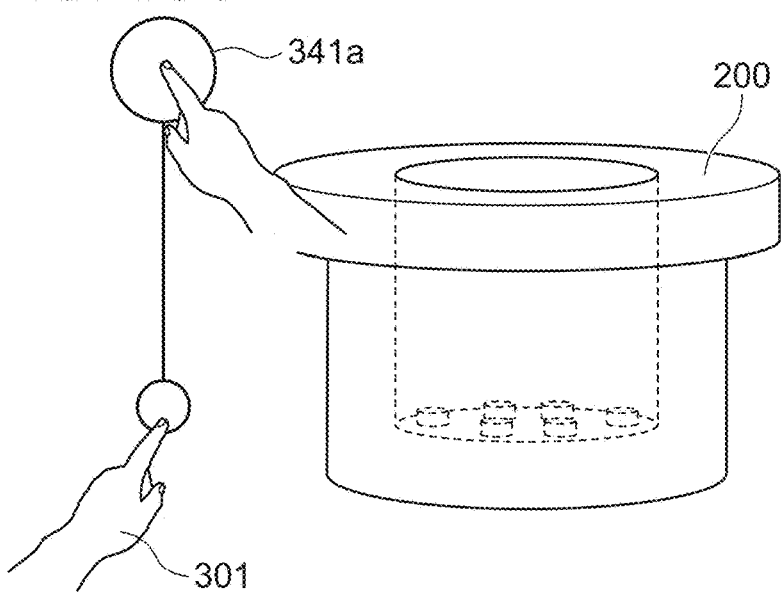

First, as shown in FIG. 13A, the user points with the finger of one hand to a position where a virtual object will be generated. The user utters a voice command to set the position of a portion of the object. The processing device 10 detects the voice command included in utterance 331. The processing device 10 measures the position of the fingertip and acquires the position. Then, as shown in FIG. 13B, the user points to the position of another portion of the object with the finger of the other hand, and utters a voice command to generate the object. The processing device 10 detects the voice command included in the utterance 332 and generates the object 341*a*, as shown in FIG. 13C.

In the illustrated example, the one hand is the left hand 301. The other hand is the right hand 302. In this example, the finger position of the left hand 301 is recognized as the start point of a vector, and the finger position of the right hand 302 is recognized as the end point of the vector. At the start and end points of the vector, an object with a preset shape is generated at each point.

Figure 14A:
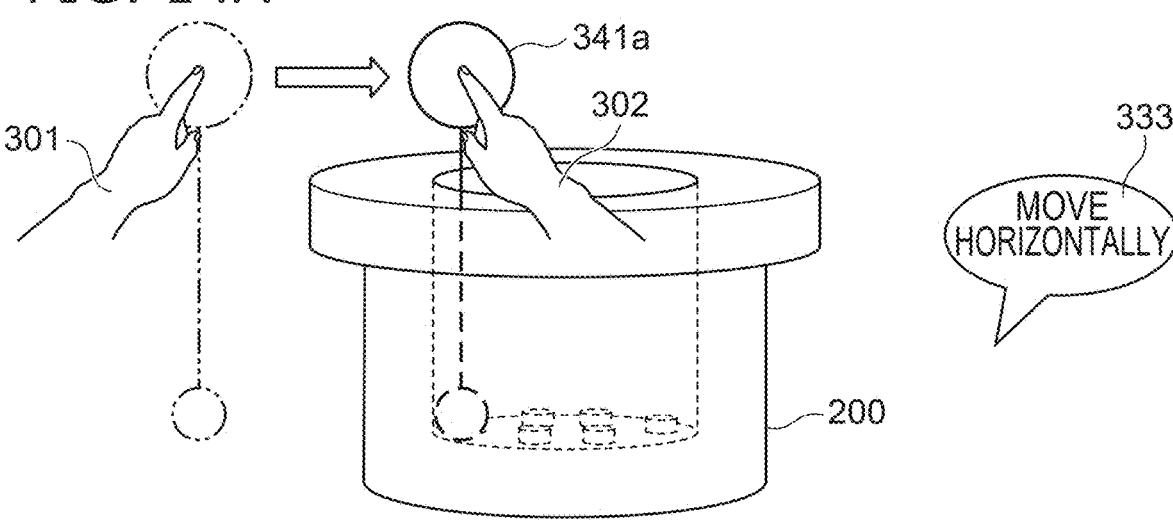
FIGS. 14A to 14C are schematic views for explaining the embodiment of the present invention.
Figure 14B:
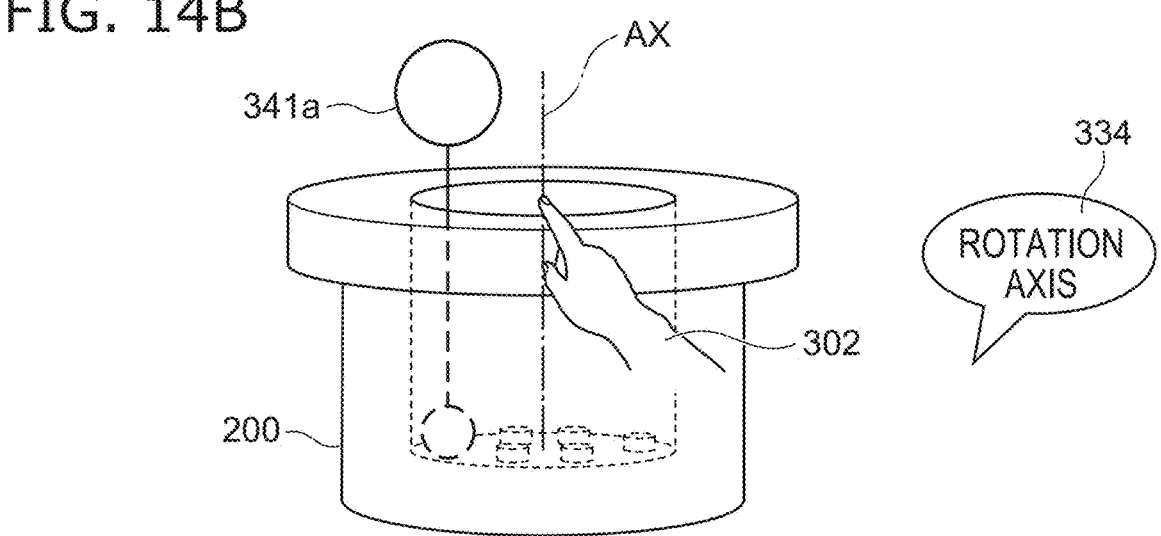
Figure 14C:
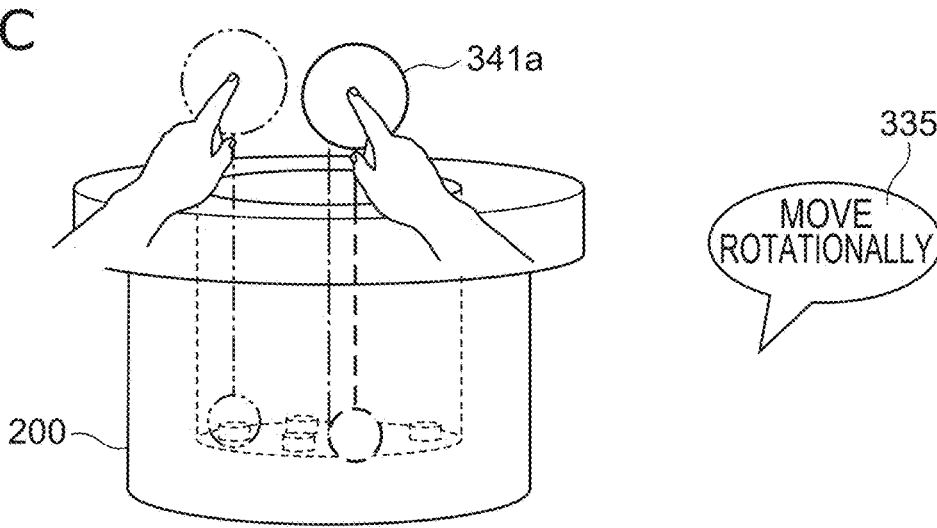

The user can adjust the position and size of the object 341*a* similarly to the object 321. As shown in FIG. 14A, the user may be able to move the object 341*a* horizontally by utterance 333 and a finger movement. Alternatively, as shown in FIG. 14B, the user may be able to set a rotation axis AX for movement by utterance 334 and pointing. As shown in FIG. 14C, the user can move the object 341*a* around the rotation axis AX by utterance 335 and a finger movement.

Figure 15A:
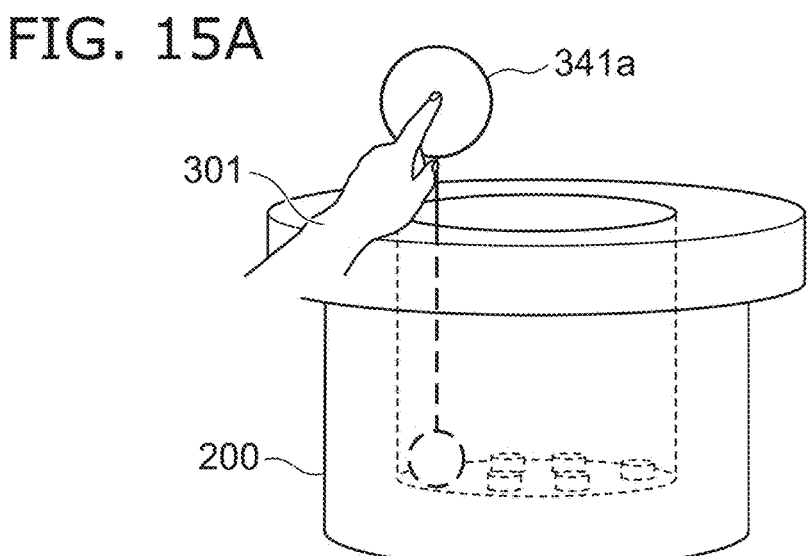
FIGS. 15A and 15B are schematic views for explaining the embodiment of the present invention.
Figure 15B:
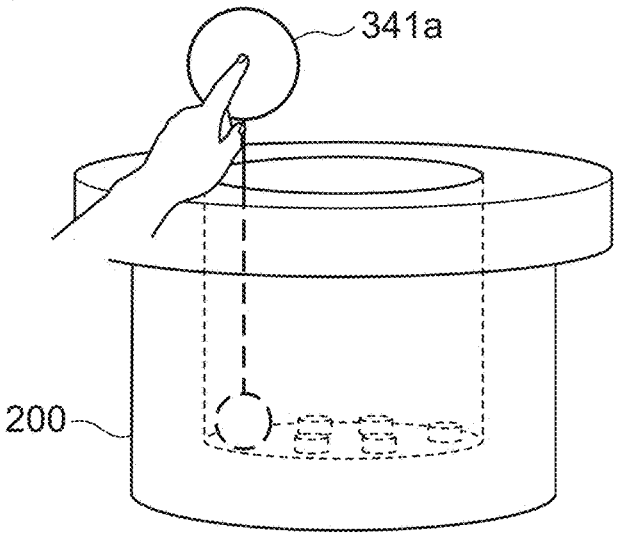
Figure 15B:

The user then touches the object 341*a* with the finger, as shown in FIG. 15A. As shown in FIG. 15B, an attribute is assigned to the object 341*a* by utterance 336. In this example, the object 341*a* is generated at a position where a hand should be located during the work. Thus, when the task is appropriately performed, the hand comes into contact with the object 341*a*. The user issues utterance 336 of "guide ball" to assign to the object 341*a* the function of detecting that the hand has touched the object 341*a*. During the actual task, the processing device 10 calculates the distance between the hand and the object 341*a*. When the distance is less than a predetermined threshold, the processing device 10 determines that the hand is in contact with the object 341*a*. Instead of a hand, the function of detecting that the tool has come into contact with the object 341*a* may be assigned to the object 341*a*.

Figure 16A:
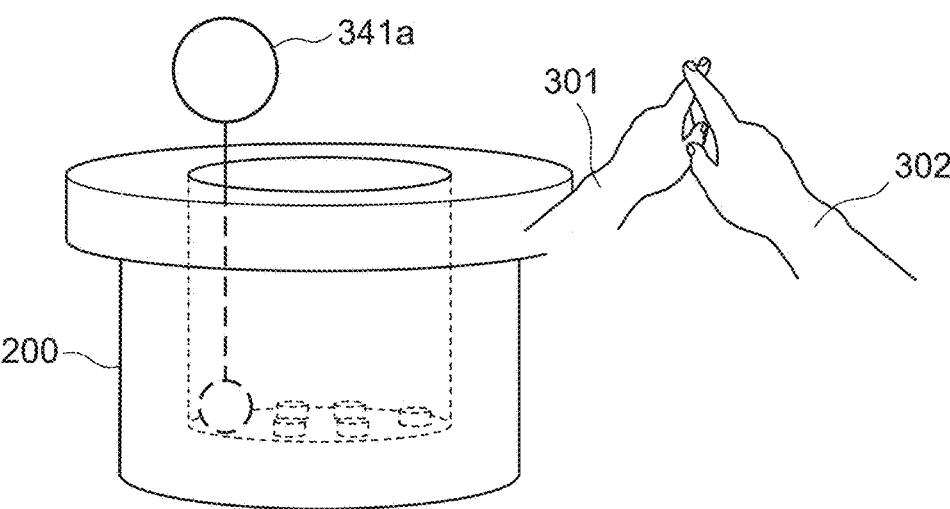
FIGS. 16A to 16C are schematic views for explaining the embodiment of the present invention.
Figure 16B:
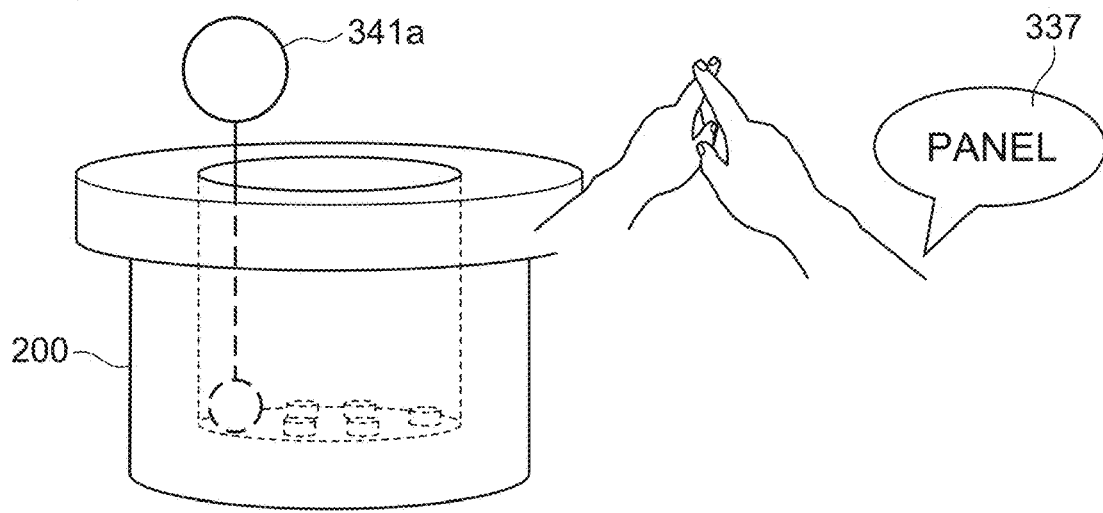
Figure 16C:
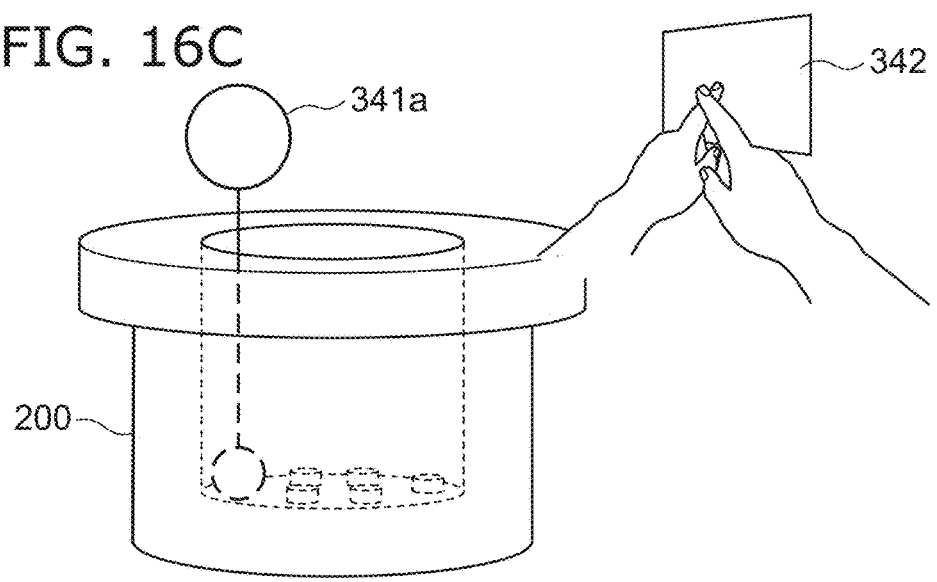

Next, as shown in FIG. 16A, the user shows a position to generate another object with the finger of one hand. The user indicates the orientation of the object with the finger of the other hand. As shown in FIG. 16B, the user utters a voice command to generate a virtual object. The processing device 10 detects the voice command included in the utterance 337 and generates the object 342, as shown in FIG. 16C. The object 342 displays data related to the task while the worker performs the task. The left hand 301 and the right hand 302 can specify the orientation of the object 342 for displaying data.

Figure 17A:
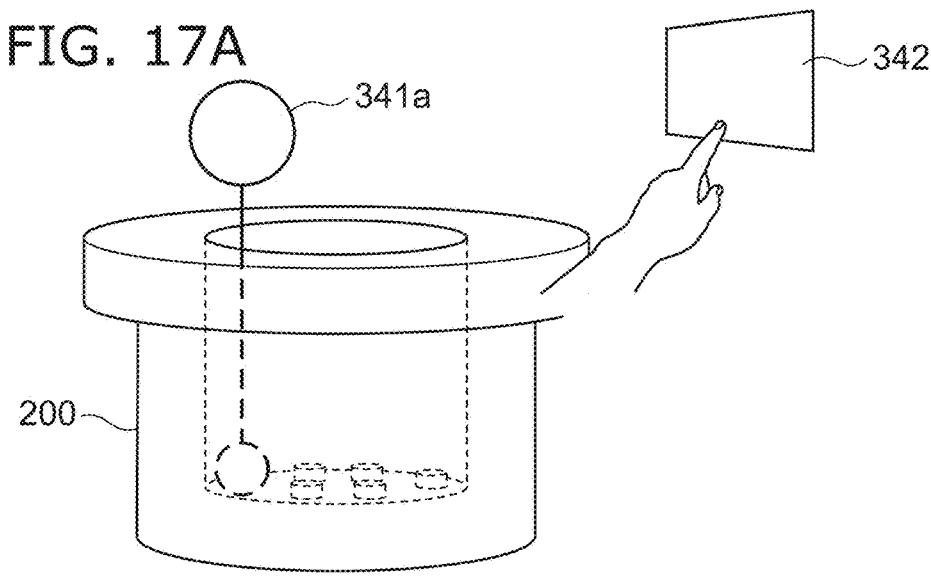
FIGS. 17A to 17C are schematic views for explaining the embodiment of the present invention.
Figure 17B:
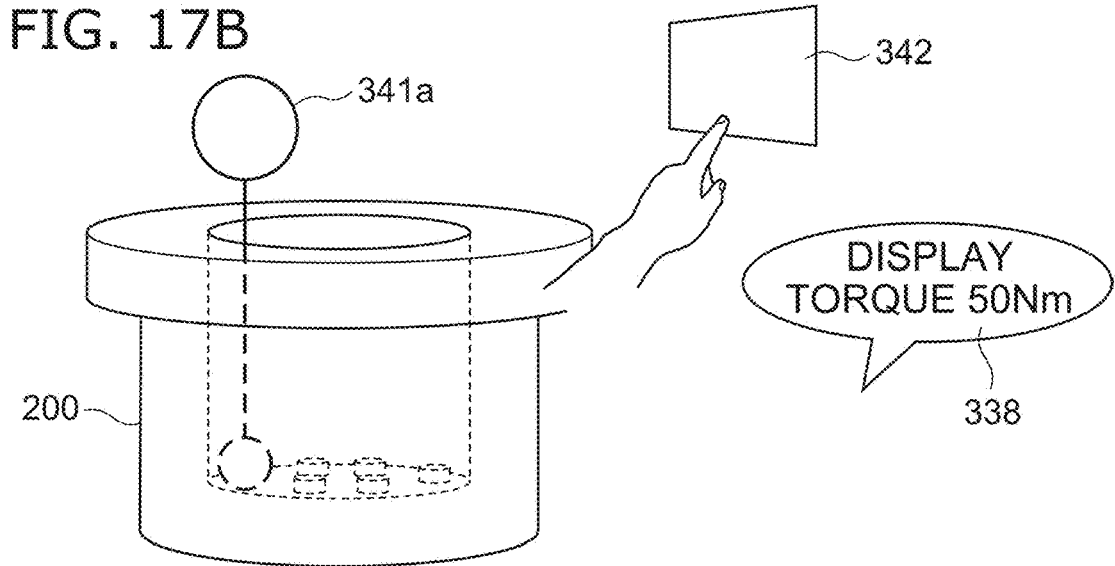
Figure 17C:
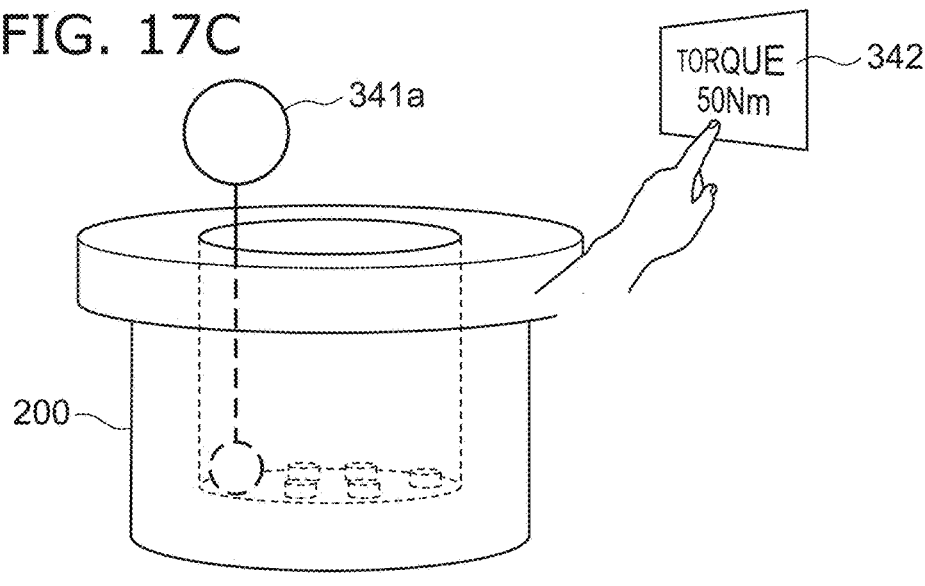

The user touches the object 342 with a finger, as shown in FIG. 17A. As shown in FIG. 17B, the user issues the utterance 338 to indicate the data which the user wants to display on the object 342. The processing device 10 detects the voice command and content included in the utterance 338 and displays the data on the object 342 as shown in FIG. 17C.

Figure 18:
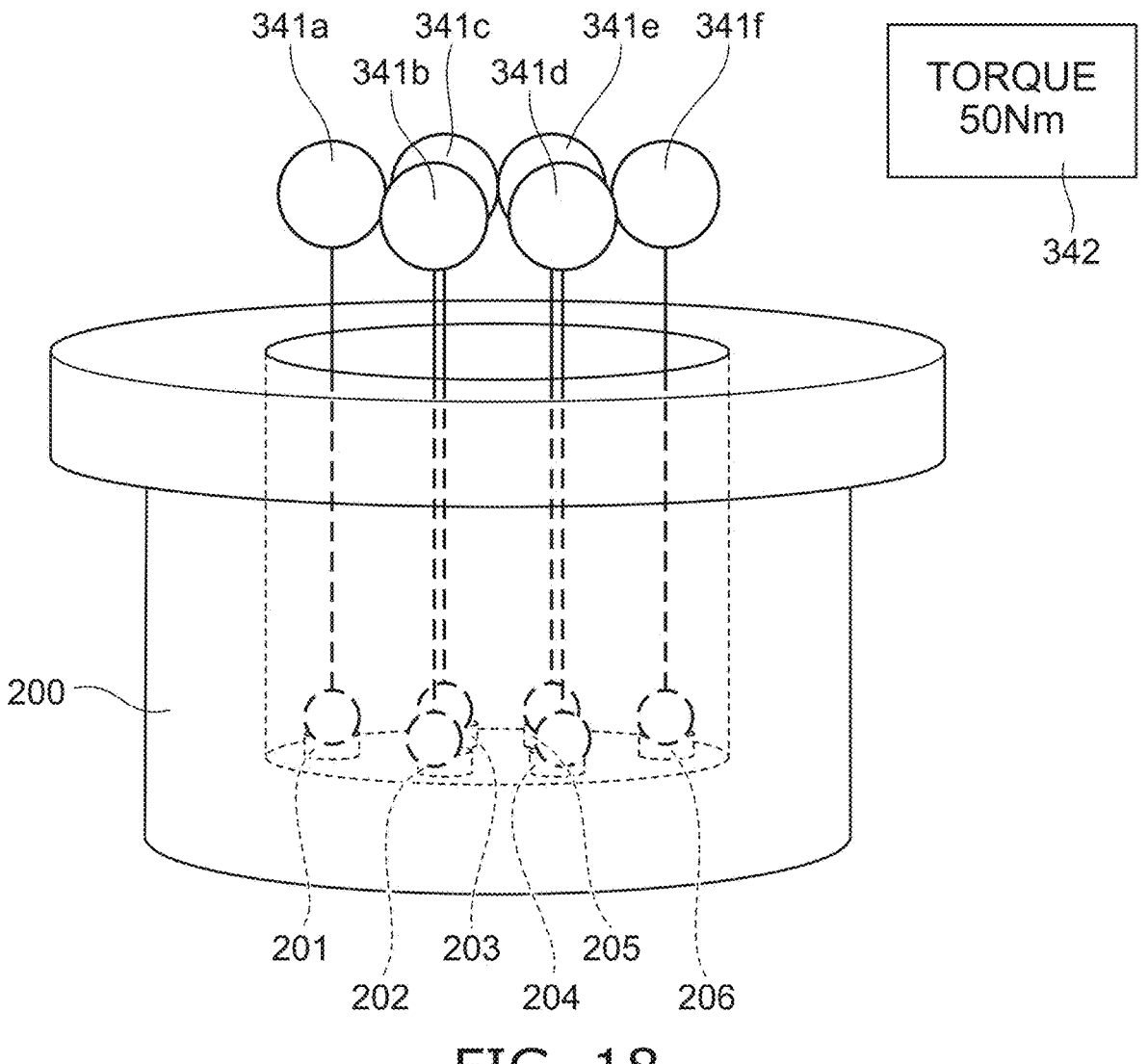
FIG. 18 is a schematic view for explaining the embodiment of the present invention.

Thereafter, by repeating the generation of an object similar to the object 341*a*, as shown in FIG. 18, the objects 341*a* to 341*f* are set corresponding to the multiple fastening locations 201 to 206 of the article 200, respectively. Alternatively, a command for copying the object 341*a* may be prepared. For example, the user can use a copy command to duplicate an identical object to one that has already been generated.

Besides the fingers of both hands, the start and end points of the object or the object's direction may be indicated by the direction of the palm or similar methods, as illustrated in FIG. 19A. In the illustrated example, the direction of the object is set to the direction from the back of the hand to the palm.

As shown in FIG. 19B, a command for aligning the arrangement of multiple objects may be prepared. In the illustrated example, by utterance 339, the top edges of the multiple objects are aligned to the position of the top edge of the object 341*a* pointed to with the finger. In addition to the illustrated example, it is also possible to align multiple objects at the bottom edge, the left edge, the right edge, the front side end, or the back end. Center alignment in the vertical direction, center alignment in the left and right direction, center alignment in the depth direction, etc. may be executed.

Figure 20:
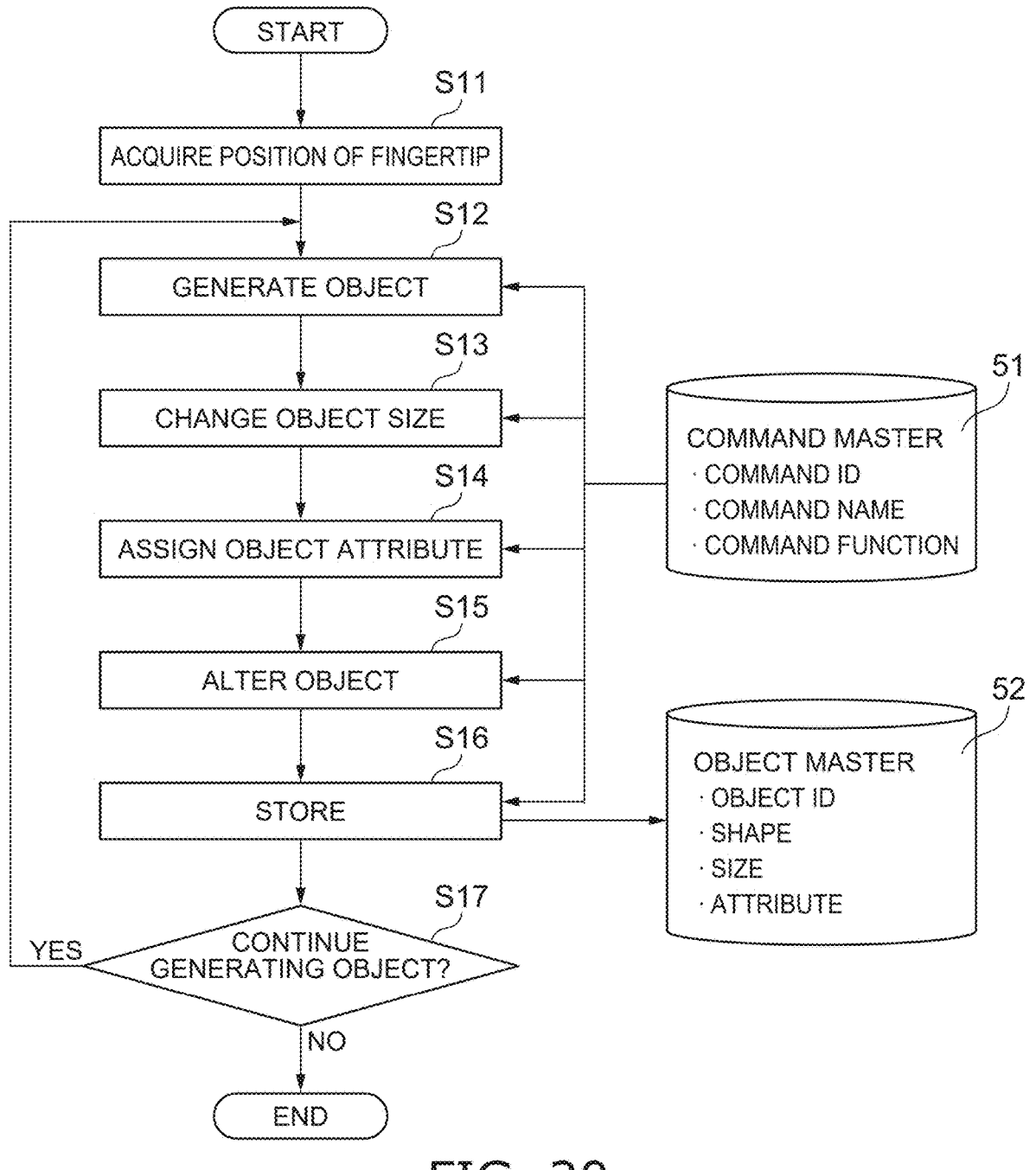
FIG. 20 is a flowchart illustrating a processing method according to the embodiment.
Figure 21:
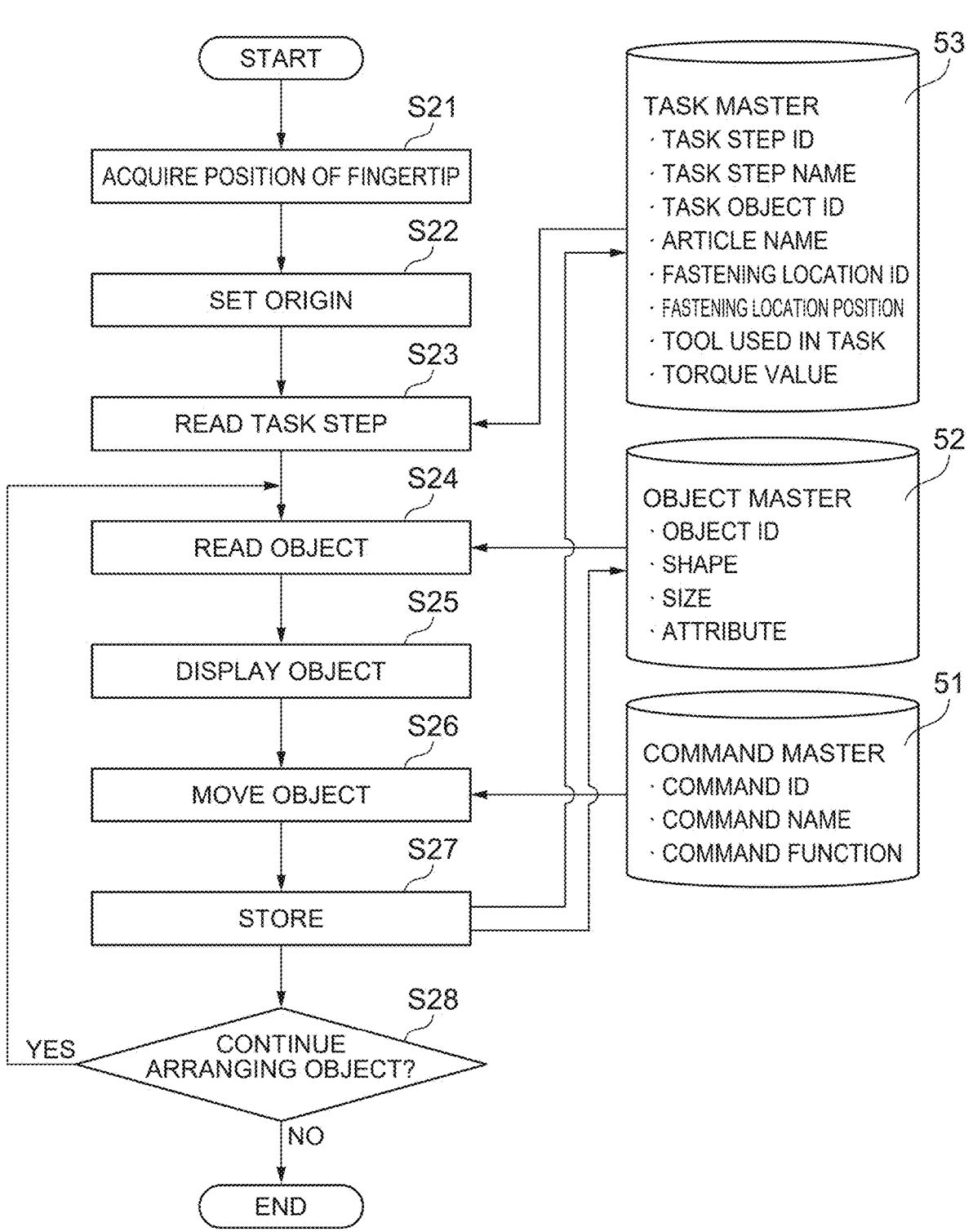
FIG. 21 is a flowchart illustrating a processing method according to the embodiment.

FIGS. 20 and 21 are flowcharts illustrating a processing method according to the embodiment.

FIG. 20 shows a method for generating a virtual object. First, the processing device 10 performs hand tracking and acquires a three-dimensional position of the fingertip (step S11). The processing device 10 refers to the command master 51 stored in the storage device 50. The command master 51 contains the ID, name, and function of each command. The processing device 10 detects a command by comparing the command registered in the command master 51 with the input (hand movement or voice) from the user. When the processing device 10 detects the command for generating a virtual object, the processing device 10 generates the object (step S12).

When the command for changing the size of the object is detected, the processing device 10 changes the size of the object (step S13). When the command for assigning an attribute to the object is detected, the processing device 10 assigns an attribute to the object (step S14). When the command for altering the object is detected, the processing device 10 alters the object (step S15).

When the generation of an object, changing its size, and assigning an attribute are completed, the user utters a command to store the object. When the command is detected, the processing device 10 stores the generated object (step S16). The object is stored in the object master 52 of the storage device 50. The object master 52 stores the ID, shape, size, attribute, etc. of each object.

The processing device 10 determines whether the generation of the object is continued (step S17). For example, the processing device 10 continues to generate the object until it receives a command indicating the end of the generation of the object. Termination conditions such as the number of objects to be generated may be predetermined. The processing device 10 terminates the generation of the object when the termination condition is satisfied. When the generation of the object is continued, the step S12 is executed again.

The order of steps S12 to S15 can be changed appropriately. Between the steps S11 and S16, the position of the object may be adjusted. In this example, the final display position of the object is determined in the association process between the object and the task step, as will be described later.

FIG. 21 shows a method of arranging an object and a method of associating it with a task. When objects are generated, each object is positioned and associated with the task so that the objects are displayed in accordance with the article during the actual task.

First, the processing device 10 performs hand tracking and acquires the three-dimensional positions of the fingertips (step S21). Next, the processing device 10 detects a marker appearing in the image and sets the origin of the three-dimensional coordinate system based on the marker (step S22). The processing device 10 accepts the selection of a task step associated with the object and reads the selected task step from the task master 53 (step S23).

For example, when manufacturing an article, multiple processes are performed. One process consists of one or more task steps. In one task step, a fastening task may be performed. The task master 53 includes data related to the task step and is stored in the storage device 50. The task master 53 includes the ID and name of each task step, the ID and name of the workpiece in each task step, etc. When a screw is tightened in a certain task step, the ID and position of each fastening location, the data of the tool used, the target torque value, etc. are also stored in the task master 53.

The task step is selected by the user. The task step can be associated with the marker for setting the origin. In such a case, the processing device 10 reads the task step associated with the marker.

The processing device 10 accepts the selection of the object to be associated and reads the selected object from the object master 52 (step S24). The processing device 10 displays the read object (step S25). The processing device 10 receives a command input from the user and moves the object according to the command (step S26). At this time, the size, orientation, etc. of the object may be adjusted. The processing device 10 stores the position of the object after movement in the object master 52. Furthermore, the processing device 10 stores the data of the object in the object master 52 and associates it with the data of the read task step (step S27).

When the object to be placed is associated with a fastening location, the fastening location is also selected in the step S23. The processing device 10 associates the data of the arranged object with the ID of the selected fastening location and stores them in the task master 53.

The processing device 10 determines whether the arrangement of the object is continued (step S28). For example, the processing device 10 continues to arrange the object until it receives a command indicating the end of the arrangement of the object. Termination conditions may be predetermined. The processing device 10 terminates the arrangement of the object when the termination condition is satisfied. When the arrangement of the object is continued, the step S24 is executed again.

With the above processes, the generation of the object, the arrangement of the object, and the association of the object with the task step are completed. The prepared object is displayed to the worker during the actual task. The worker can perform their tasks more smoothly with the objects displayed.

The advantages of the embodiment will be described.

The display of virtual objects on XR devices can assist in tasks in a variety of ways. Objects in virtual space are usually generated using dedicated software on a PC. Therefore, it is difficult for people with not enough knowledge of the software to set up the object. For example, a worker can easily guess what kind of object should be displayed and at which position to make the task easier. However, ordinary workers are not accustomed to handling software related to virtual space, and it is difficult for them to set up objects.

Regarding this problem, according to the embodiment of the present invention, a virtual object can be generated using an XR device. Specifically, the processing device 10 detects a human hand from an image acquired by the imaging device 20. The processing device 10 generates a virtual object in the virtual space based on a hand gesture, voice command, etc. In other words, a person wearing the XR device can cause the processing device 10 to generate an object simply by entering a hand gesture or voice command. In addition, the processing device 10 detects the movement of the person's hand by hand tracking, and changes the position and size of the object based on the movement of the hand. The person can adjust the position and size of the object by moving the hand while entering commands to change the position and size.

According to the embodiment, generation of the objects, adjustment of the position, and adjustment of the size can be performed by commands and hand movements prepared in advance. Therefore, even a person with little specialized knowledge can easily prepare a virtual object.

As a specific example, in general, task master 53 in which a task procedure is defined is prepared for the task in advance. If command master in which hand gestures, voice commands, etc. are defined is prepared, the embodiments of the present invention can be implemented using the task master 53. For example, the worker involved in the task or the manager thereof prepares an object to support the task. By appropriately associating the prepared object with the data of the task master 53, the prepared object can be displayed during the actual task.

When a virtual object is prepared to support tasks in the real space, it is necessary to match the position, orientation, etc. of the object to the physical object in the real space. That is, the three-dimensional coordinate system of the virtual space when the objects are prepared is set to be the same as the three-dimensional coordinate system of the virtual space when the task is performed. Further, the positional relationship between the origin of the three-dimensional coordinate system and the workpiece when the objects are prepared is set to the same as the positional relationship between the origin of the three-dimensional coordinate system and the workpiece when the task is performed.

In order to facilitate these settings, as shown in FIG. 3, it is preferable that the marker 210 for setting the origin is prepared in the real space. In a case where the object is prepared, when the marker 210 is detected from the image, the processing device 10 sets the three-dimensional coordinate system with the marker 210 as the origin. When the task is performed, the processing device 10 detects the marker 210 from the image and sets the three-dimensional coordinate system based on the marker 210. If the positional relationship between the marker 210 and the article to be worked on does not change, the prepared object can be displayed to match the article during the task.

Attributes indicating the object's function can also be assigned to the object. In the above-described example, the function of detecting that a prescribed physical object comes into contact with a virtual object is provided as an attribute. In a case where the attribute of "jig" is assigned to the object, when the tool comes into contact with the object, the processing device 10 outputs an alert. In a case where the attribute of "guide ball" is assigned to the object, when the hand or tool comes into contact with the object, the processing device 10 estimates (infers) that a screw is being turned to the corresponding fastening location.

In particular, the object is preferably displayed corresponding to the fastening location. When a large article is manufactured, the number of fastening locations is large, and it may be difficult for the worker to grasp all the fastening locations. Further, as shown in FIG. 3, if some of the fastening locations are in a position that is difficult to see, screws may be left untightened.

When an object is displayed corresponding to the fastening location, it is preferable that the data related to the fastening location and the object are linked. Further, it is preferable that the function (attribute) of detecting that the hand or tool comes into contact is assigned to the object. According to this method, when a hand or tool is in contact with an object, it can be estimated that the screw is being turned to the fastening location corresponding to the object. Based on the estimated result, the processing device 10 may automatically generate a task record indicating which fastening location the screw has turned.

FIGS. 22A, 22B, 23, 24A, 24B, 25A, and 25B are schematic views illustrating the state during the task.

When the fastening task is performed, a task step is selected and input to the processing device 10. The processing device 10 reads the task step data from the task master 53. The processing device 10 reads the object associated with the task step.

Figure 22A:
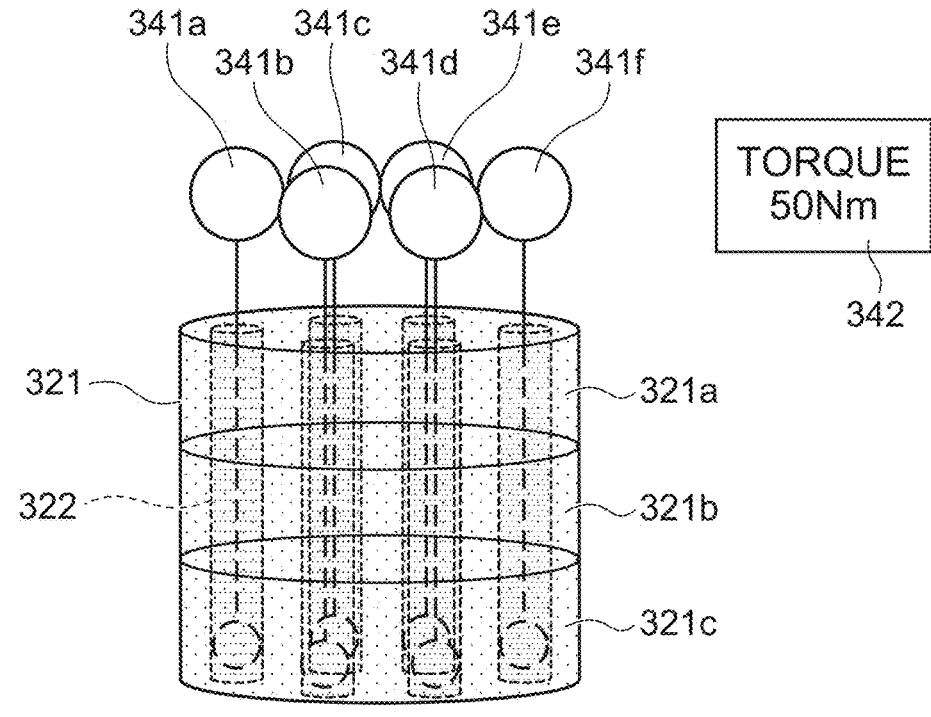
FIGS. 22A and 22B are schematic views illustrating the state during the task.

When a screw is tightened to the article 200 shown in FIG. 3, the object 321, the objects 341a to 341f, and the object 342 are loaded as shown in FIG. 22A. The processing device 10 displays the object 321, the objects 341a to 341f, and the object 342 of the virtual space superimposed on the article 200 in the real space, as shown in FIG. 22B.

Figure 22B:
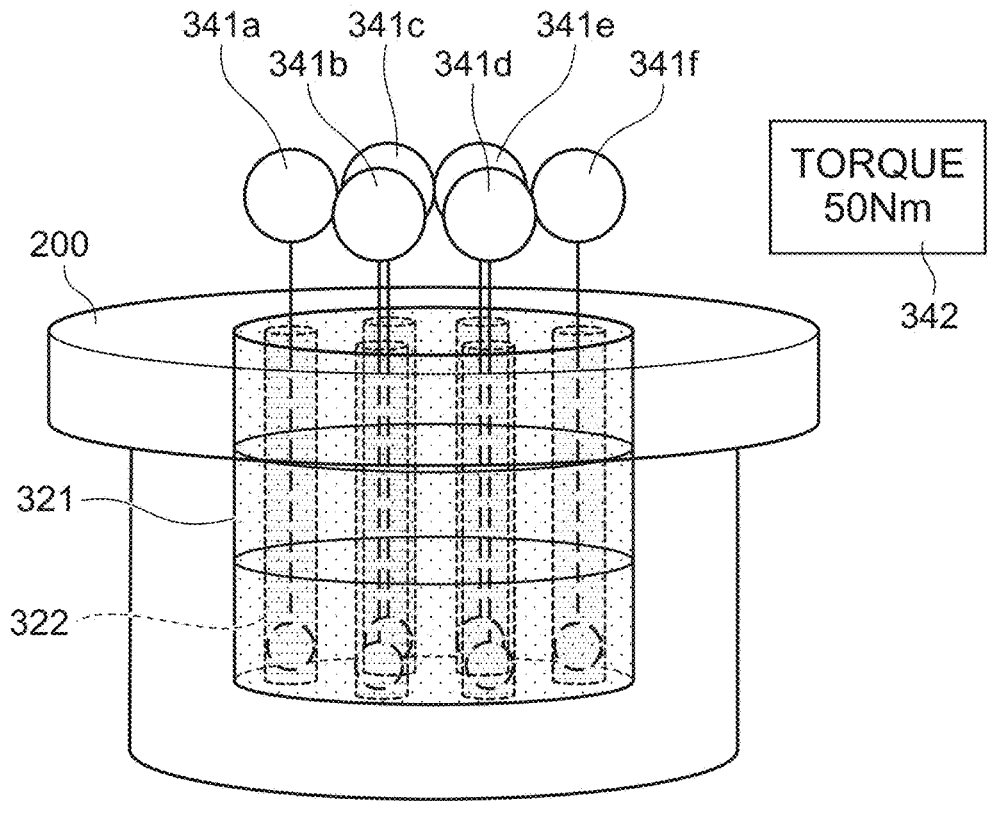
Figure 23:
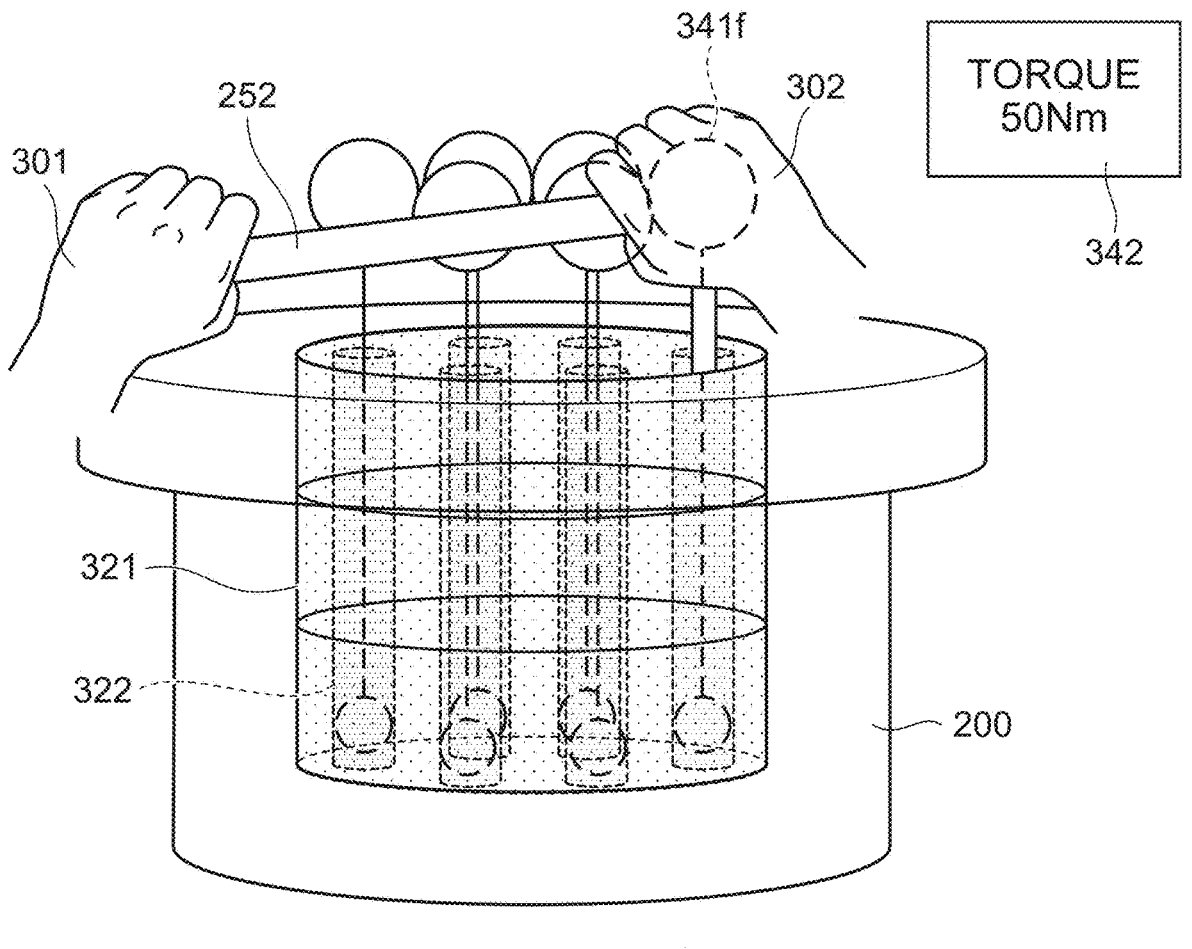
FIG. 23 is a schematic view illustrating a state during a task.
Figure 24A:
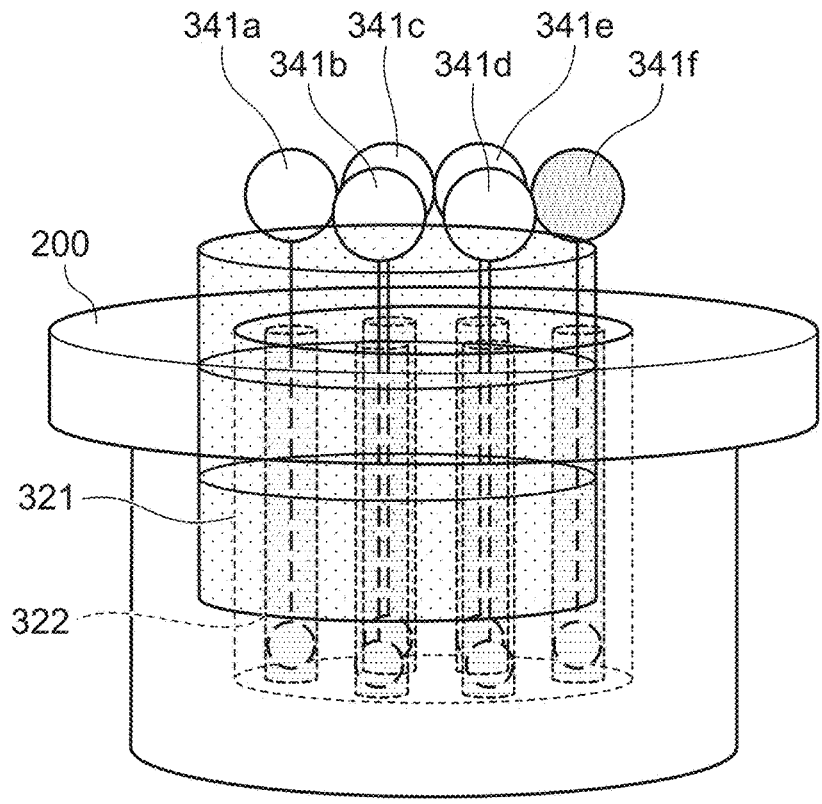
FIGS. 24A and 24B are schematic views illustrating the state during the task.
Figure 24B:
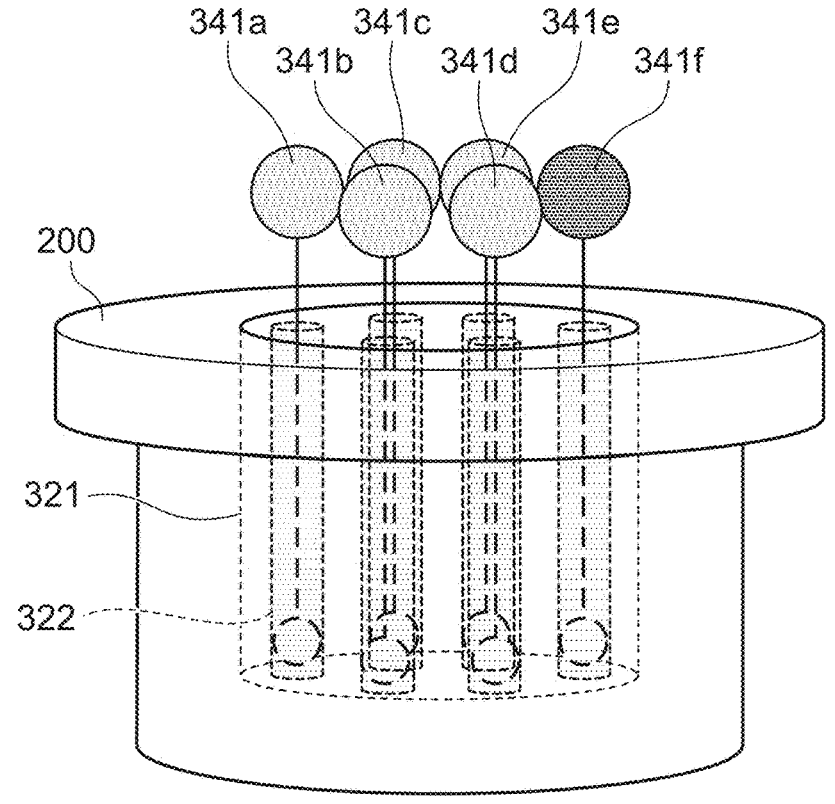

In FIG. 22B, the fastening locations 201 to 206 (not shown) are located at the bottom of the cavity of the article 200. It is difficult for the worker to see the fastening locations 201 to 206. The objects 341a to 341f are respectively displayed at the positions where the hand should be located when screws are tightened into the fastening locations 201 to 206. By displaying the objects 341a to 341f, the worker can easily grasp where to position the hand during the task.

Further, each of the objects 341a to 341f includes a spherical portion positioned away from the fastening location and a linear portion connecting the spherical portion and the fastening location. The linear portion indicates the appropriate position and orientation of the tool when the hand is located at the spherical portion. By indicating the position where the hand should be located, the position of the tool, and the orientation of the tool as shown in the figure, the worker can perform the task more smoothly.

When a hand comes into contact with any of the objects 341a to 341f, the processing device 10 detects the contact. In the example shown in FIG. 23, the hand is in contact with the object 341f. The processing device 10 can estimate that a screw is tightened into the fastening location corresponding to the object 341f. Here, the fastening location where it is estimated that the screw is tightened by contact with the object is called the "estimated location".

Preferably, a digital tool is used during the task. The processing device 10 receives the detection value from the digital tool. The processing device 10 can determine whether the screw-tightening at the estimated location has been completed using the detection value. When it is determined that screw-tightening is completed, the processing device 10 inputs the task result into the task record. According to this method, it is possible to automatically generate the task record more accurately.

For example, the digital tool is a digital torque wrench or a digital torque screwdriver, and the detection value is a torque value detected by the digital torque wrench or the digital torque screwdriver. The digital torque wrench or digital torque screwdriver detects the torque value and transmits it to the processing device 10. When the torque value exceeds a predetermined threshold, the processing device 10 determines that the screw-tightening is completed. The digital torque wrench or the digital torque screwdriver may determine whether or not a torque exceeding a predetermined threshold value has been detected. In such a case, the digital torque wrench or the digital torque screwdriver may output the determination result as the detection value instead of a torque value. The digital torque wrench or the digital torque screwdriver may output both the determination result and the torque value. The processing device 10 may associate the received detection value with the data related to the estimated location.

Attributes may be assigned to the object so that a change in the display mode of the object, output of a message, or output of a voice is performed in response to the contact of a prescribed physical object. For example, the processing device 10 changes the display mode of the object 341*f*. The display mode of the object 341*f* in which the hand is in contact differs from the display mode of the object 341*f* in which the hand is not in contact. In the illustrated example, the color of the object 341*f* is changed. The size or shape of the object 341*f* may change. The contact of the hand to the object 341*f* may be notified by a message or voice. Thereby, the user can easily determine whether or not a prescribed physical object is in contact with the virtual object.

After a screw has been tightened into one location and another screw has been tightened into another location, the one screw at the one location may be retightened. In such a case, the processing device 10 may change the display mode of the objects 341*a* to 341*f* according to the number of times the screw is tightened. In the example shown in FIG. 24A, a screw is tightened into a fastening location corresponding to the object 341*f*. Screws are not tightened into the fastening locations corresponding to the other objects 341*a* to 341*e*. In the example shown in FIG. 24B, the screw at the fastening location corresponding to the object 341*f* is retightened. The screws at the fastening locations corresponding to the other objects 341*a* to 341*e* have not yet been retightened. The number of screw-tightening at the fastening location corresponding to the object 341*f* differs from the numbers of screw-tightening at the fastening locations corresponding to the objects 341*a* to 341*e*. Therefore, the display mode of the object 341*f* is different from the display mode of the objects 341*a* to 341*e*.

Figures 25A, 25B:
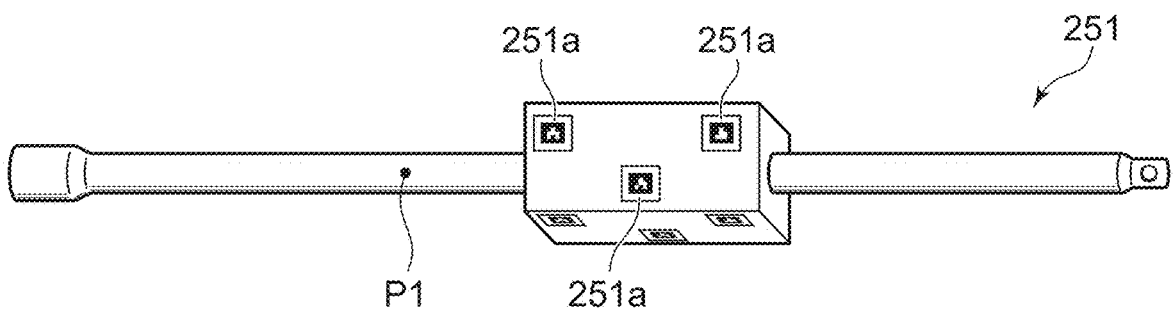
FIGS. 25A and 25B are schematic views illustrating the state during the task.

The attribute of a jig is assigned to the object 321. For example, as shown in FIG. 25A, multiple markers 251*a* are attached to the extension bar 251. The processing device 10 detects multiple markers 251*a* from the image. The processing device 10 measures the position of each marker 251*a*. The positional relationship between the multiple markers 251*a* and the extension bar 251 is registered in advance. Based on this positional relationship, the processing device 10 calculates the position P1 of the extension bar 251 from the position of each marker 251*a*. The processing device 10 determines that the extension bar 251 is in contact with the object 321 when the position P1 of the extension bar 251 overlaps a portion other than the hole 322 of the object 321.

Similar to the object 341*f*, the attributes to indicate contact to the user can be assigned to the object 321. In the example shown in FIG. 25B, the processing device 10 displays the message 326 as an alert. The processing device 10 may change the color, size, shape, etc. of the object 321.

By assigning attributes to the object, it is possible to support the fastening task in various ways. The specific function of the attribute is registered in the command master 51. Multiple functions described above may be registered in one attribute. Only a single function may be registered to one attribute, and multiple attributes may be assigned to one object.

Figure 26:
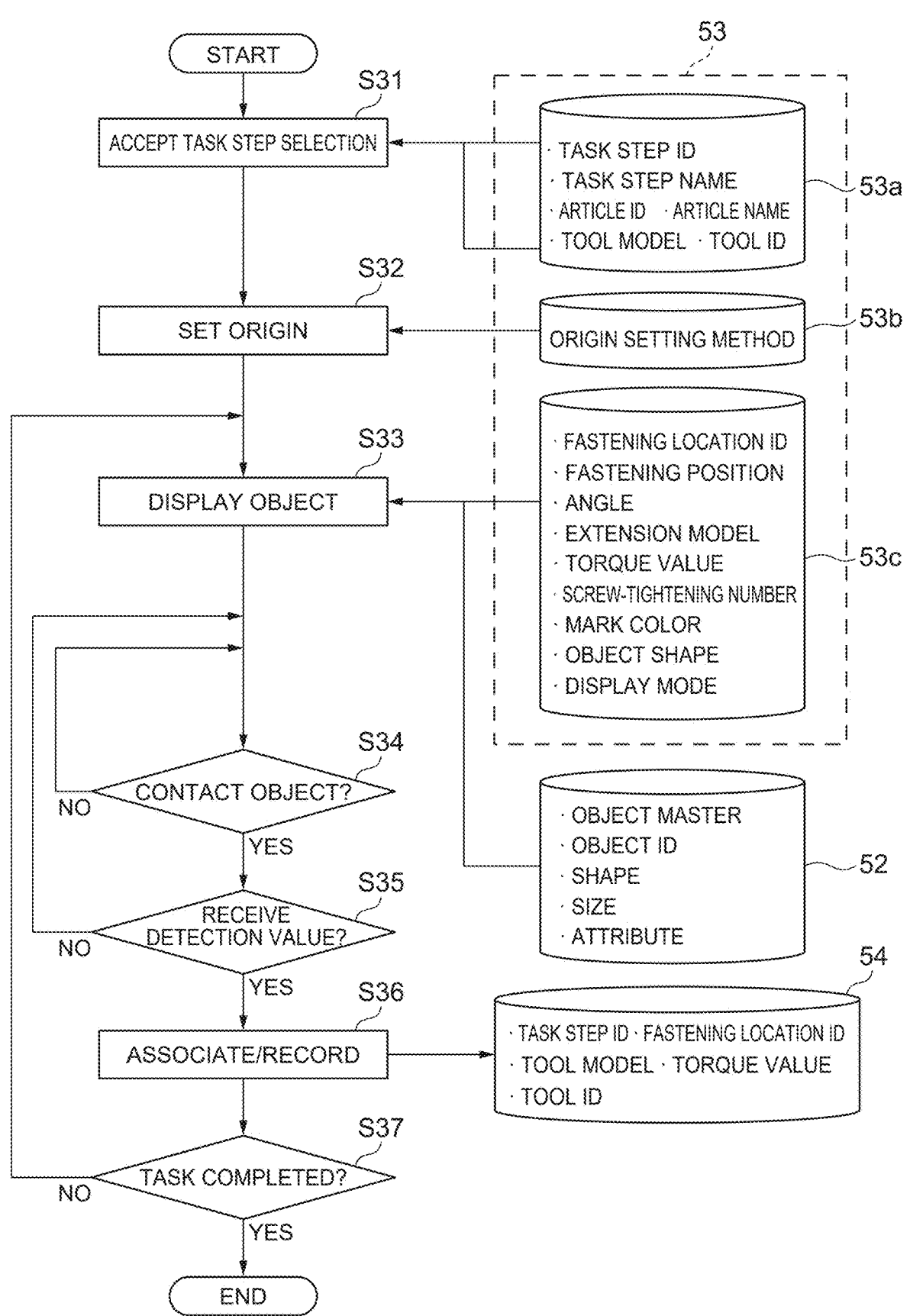
FIG. 26 is a flowchart illustrating a processing method according to the embodiment.

FIG. 26 is a flowchart illustrating a processing method according to the embodiment.

FIG. 26 shows the flow of processing during the actual work. For example, the first processing device performs the processing shown in FIGS. 20 and 21, and virtual objects are prepared. Thereafter, the second processing device executes the processes shown in FIG. 26. The second processing device may be the same as the first processing device or may be different from the first processing device. That is, the MR device used in the task may or may not be the same as the MR device used when the objects are prepared.

First, the processing device 10 accepts the selection of a task step (step S31). The task step is selected by the worker. The task steps to be performed may be instructed by the higher-level system, and the processing device 10 may accept selection according to the instructions. Based on the data obtained from the imaging device 20 or other sensors, the processing device 10 determines the task step to be performed, and the processing device 10 may accept a selection based on the determination result.

The processing device 10 refers to the task master 53 and acquires data of the selected task step. The task master 53 includes task step data 53*a*, origin data 53*b*, and fastening location data 53*c*.

The task step data 53*a* contains a task step ID, a task step name, an ID of the article to be worked, an article name, a tool model used in a task, a tool ID, etc. The tool model indicates the classification of tools by structure, appearance, performance, etc. The processing device 10 can accept either the task step ID, the task step name, the article ID, or the article name as the selection of the task. When there are multiple candidates in the selection of task steps, the processing device 10 may output an inquiry asking which candidate to select.

The processing device 10 refers to the origin data 53*b*. The origin data 53*b* contains a method for setting the origin for each task. The processing device 10 acquires a method for setting the origin in the selected task and sets the origin based on input by the worker (step S32). As described above, the marker is preferably used for setting the origin.

The processing device 10 refers to the fastening location data 53*c*. In the fastening location data 53*c*, fastening location IDs are stored. The fastening position, the angle, the extension bar model, the torque value, the screw-tightening number, the mark color, the object shape, and the display mode are stored for each fastening location ID. The fastening position indicates the position of each fastening location. The angle indicates the angle of the tool or extension bar when tightening the screw at each fastening location. The extension bar model indicates the classification of extension bars by structure, external shape, performance, etc. The torque value indicates the magnitude of the torque required when a screw is tightened into each fastening location. The screw-tightening number indicates the number of screw-tightenings at each fastening location. The mark color is the color of the mark indicating the completion of the screw-tightening. The object shape indicates the shape of the object displayed corresponding to each fastening location. The display mode indicates the mode of each object to be displayed. The display mode is set for each screw-tightening number. The screw-tightening number, the object shape, the display mode, etc. can be assigned as attributes to the object by a command when the object is generated.

The processing device 10 displays the prepared object based on the set origin and the data of the object master 52 (step S33). The processing device 10 repeatedly determines whether the prescribed physical object comes into contact with the virtual object (step S34). Thereby, the contact of the tool with the "jig" object, the contact of the hand with the "guide ball" object, etc. are detected.

When the touch of the hand with the "guide ball" object is detected, the processing device 10 determines whether the detection value has been received from the digital tool (step S35). When the detection value is not received, the processing device 10 executes the step S34 again.

When the hand comes into contact with the "guide ball" object and the detection value has been received, the processing device 10 associates the data related to the fastening location with the detection value, and records the data in the history data 54 (task record) (step S36). For example, a torque value is associated with the fastening location ID and recorded. In the illustrated example, the task step ID, the tool ID, the tool model, etc. are also associated.

The processing device 10 determines whether the task step selected in the step S31 has been completed (step S37). When the task is not completed, the display of the object according to the step S33 continues.

In the example described above, the processing system 1 according to the embodiment is implemented as an MR device. Not limited to this example, the processing system 1 according to the embodiment may be implemented as a VR device.

As an example, a virtual object representing an article to be worked on is generated in the virtual space. For that object, another object is generated to support the task, as in the example described above. The VR device user can experience the fastening task in the virtual space that includes these objects.

For example, in the device shown in FIG. 2, a lens 111 and a lens 112 that do not transmit light are used. Only the virtual space is displayed on the lens 111 and the lens 112. In order to enhance the sense of immersion, a goggle-type or helmet-type VR device may be used.

FIG. 27, FIG. 28A, FIG. 28B, and FIG. 29 are schematic views for explaining the embodiment of the present invention.

Figure 27:
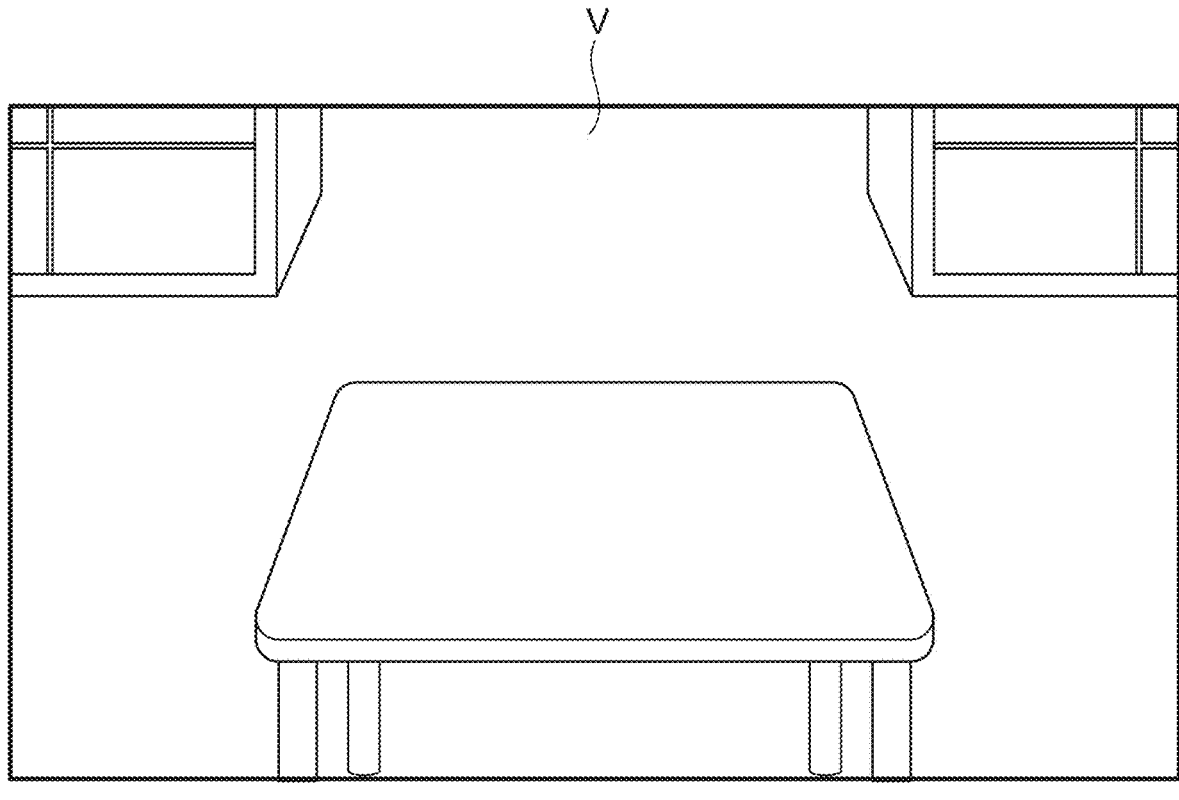
FIG. 27 is a schematic view for explaining the embodiment of the present invention.

FIG. 27 shows a virtual space V displayed on the display device 30. In the illustrated example, a virtual desk, a virtual shelf, and other virtual items are displayed in the virtual space V. The processing device 10 detects the user's hand and displays the detected hand in the virtual space V.

Figure 28A:
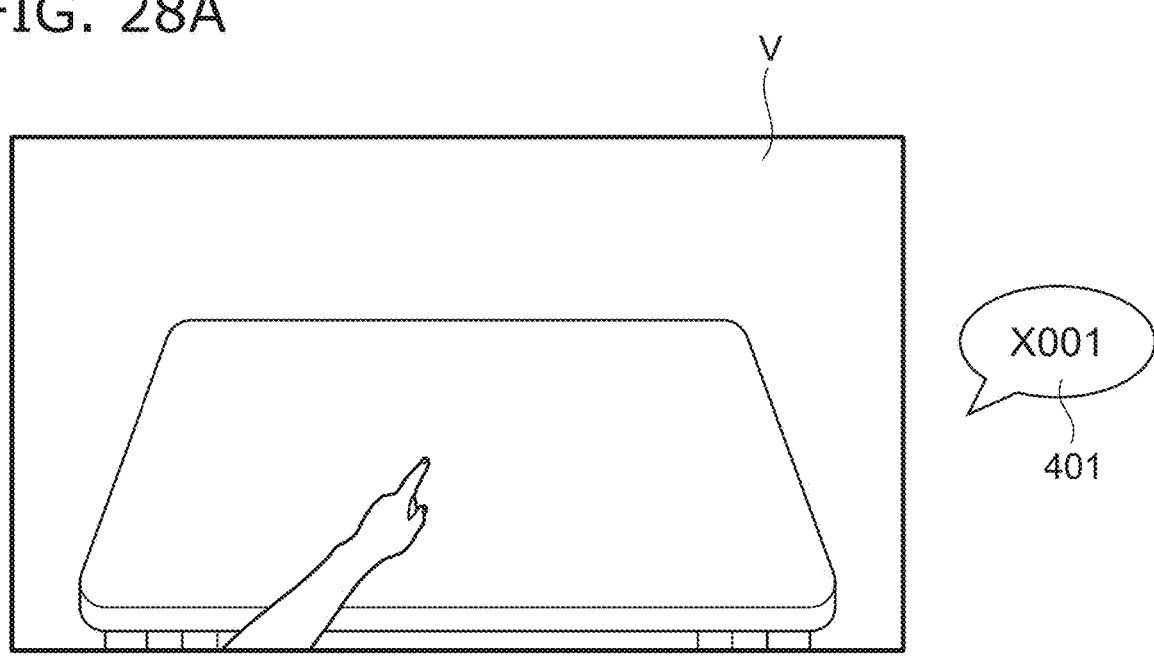
FIGS. 28A and 28B are schematic views for explaining the embodiment of the present invention.

As shown in FIG. 28A, the user points to the position where the object is generated in the virtual space V with a finger and utters a task object ID and a voice command. In this example, the task object ID is registered in advance as a voice command. The user specifies the task object ID through utterance 401.

Figure 28B:
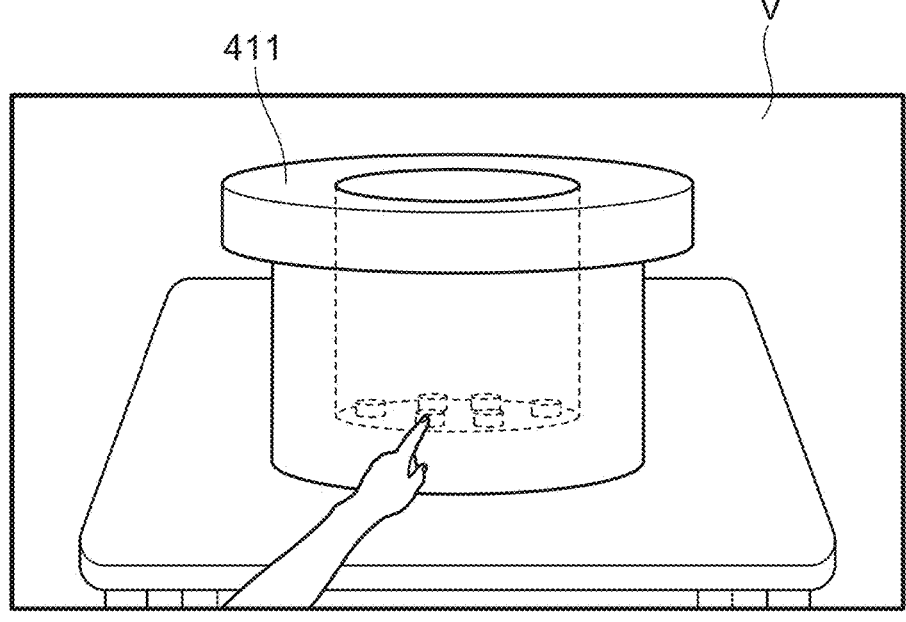

The processing device 10 detects the utterance 401 and refers to the task object ID stored in the task master. As shown in FIG. 28B, the processing device 10 generates an object 411 having the same size as the article with the task object ID in the virtual space V. Thereafter, the user can adjust the position or size of the object 411 by a method similar to the method shown in FIGS. 6A to 8C. Further, attributes may be assigned to the object 411.

Figure 29:
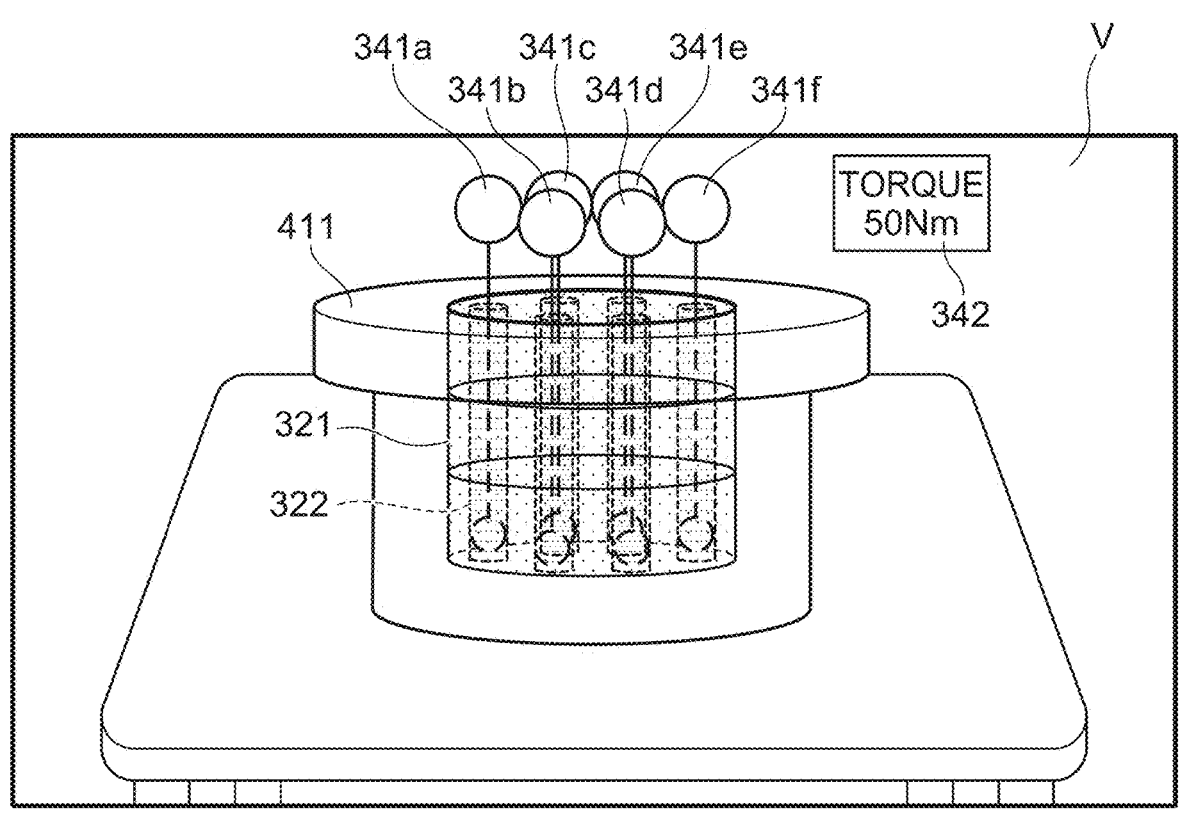
FIG. 29 is a schematic view for explaining the embodiment of the present invention.

Thereafter, the object 321, the object 341a to 341f, and the object 342 are generated by the method described in FIGS. 5A to 11C and 13A to 17C. Thereby, as shown in FIG. 29, objects for simulating the fastening task are prepared in the virtual space V.

When the VR device is used, the object to be worked on and the object to support the task are generated in the same virtual space. Therefore, it is not necessary to match the position and size of the object to support the task to the article in the real space. Thus, the origin can be set arbitrarily. It is not necessary to use the marker 210 shown in FIG. 3.

In the example described above, an example in which an XR device is used to assist with tasks has been described. Embodiments of the present invention are also effective when generating virtual objects for purposes other than tasks. According to an embodiment of the present invention, an object can be easily generated in the virtual space even by a person who has little specialized knowledge about virtual spaces.

In the example described above, an example in which a screw is tightened into a fastening location has been mainly described. Embodiments of the present invention are applicable not only when a screw is tightened into the fastening location, but also when the screw in the fastening location is loosened. For example, when maintaining, inspecting, or repairing a product, the screws at the fastening locations are loosened. For example, by displaying a virtual object when loosening a screw, the worker can perform the task more smoothly.

Figure 30:
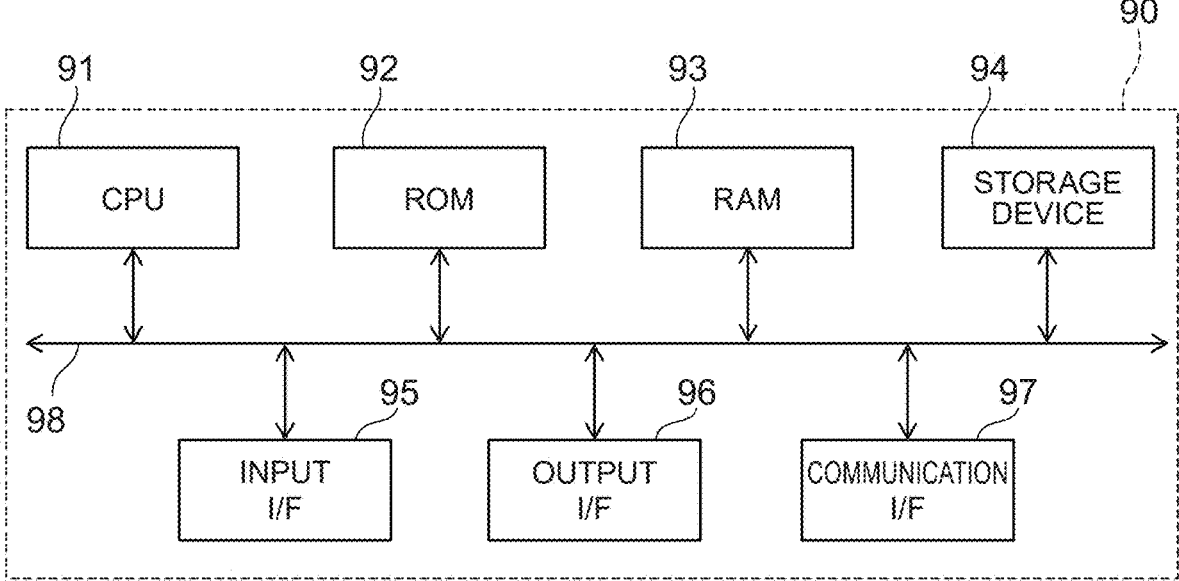
FIG. 30 is a schematic diagram illustrating a hardware configuration.

FIG. 30 is a schematic diagram illustrating a hardware configuration.

For example, a computer 90 shown in FIG. 30 is used as the processing device 10 or the processing device 150. The computer 90 includes a CPU 91, ROM 92, RAM 93, a storage device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the storage device 94. When executing the programs, the CPU 91 executes various processing by controlling configurations via a system bus 98.

The storage device 94 stores data necessary for executing the programs and/or data obtained by executing the programs. The storage device 94 includes a solid state drive (SSD), etc. The storage device 94 may be used as the storage device 50 or the storage device 170.

The input interface (I/F) 95 can connect the computer 90 to the input device 40. The CPU 91 can read various data from the input device 40 via the input I/F 95.

The output interface (I/F) 96 can connect the computer 90 and an output device. The CPU 91 can transmit data to the display device 30 via the output I/F 96 and can cause display device 30 to display information.

The communication interface (I/F) 97 can connect the computer 90 and a device outside the computer 90. For example, the communication I/F 97 connects the digital tool and the computer 90 by Bluetooth (registered trademark) communication.

The data processing of the processing device 10 or the processing device 150 may be performed by only one computer 90. A portion of the data processing may be performed by a server or the like via the communication I/F 97.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD-R, DVD-RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

Furthermore, the processing system 1 may be implemented as another device other than the MR device. For example, the processing system 1 may be implemented using a general-purpose PC. In such a case, a monitor can be used as the display device 30. An input device 40 such as a keyboard, a microphone, or a touchpad can be used. The imaging device 20 may be positioned away from the user to image the user's actions. The user input commands to the processing device 10 using the input device 40 while referencing the display device 30.

The embodiments of the invention includes following features.

Feature 1

A cross-reality device, comprising:

an imaging device configured to acquire an image;

a display device configured to display a virtual space; and a processing device configured to detect a hand of a human from the image, the processing device being configured to generate an object in the virtual space in response to a command input by the human, and change a position and a size of the generated object in accordance with a movement of the hand.

Feature 2

The cross-reality device according to feature 1, wherein in a case where a marker exists in a real space is imaged by the imaging device, the processing device sets a three-dimensional coordinate system in the virtual space based on the marker, and changes the position and the size of the object in the three-dimensional coordinate system.

Feature 3

The cross-reality device according to feature 1, wherein the processing device is configured to accept a setting of an attribute indicating a function of the object, and the function is a detection of contact between a prescribed physical object and the object.

Feature 4

The cross-reality device according to feature 1, wherein the object is stored in association with data related to a fastening location of an article in a real space.

Feature 5

The cross-reality device according to feature 1, wherein the command is inputted by a voice or a hand gesture.

Feature 6

The cross-reality device according to feature 1, wherein the processing device is configured to display an object with a plurality of commands on the display device, and accept an input of the plurality of commands selected by the human.

Feature 7

The cross-reality device according to any one of features 1 to 6, wherein the display device is configured to display the virtual space overlaid on a real space.

Feature 8

A processing device, configured to:

detect a hand of a human from an image;

generate an object in a virtual space in response to a command input by the human; and change a position and a size of the generated object in accordance with a movement of the hand.

Feature 9

An object generation method performed by a first processing device, comprising:

detect a hand of a human from an image;

generate an object in a virtual space in response to a command input by the human; and change a position and a size of the object in accordance with a movement of the hand.

Feature 10

The generation method according to feature 9, wherein the first processing device detects a marker from the image, sets a three-dimensional coordinate system based on the marker, and changes the position and the size of the object in the three-dimensional coordinate system.

Feature 11

A processing method performed by a second processing device, comprising:

displaying the object generated by the generation method according to feature 9 or 10 on a display device; and detecting contact between a prescribed physical object and the object from the image in a case where the prescribed physical object is imaged.

Feature 12

A program, causing a computer to:

detect a hand of a human from an image;

detect a command input by the human;

generate an object in a virtual space in response to the detected command; and change a position and a size of the generated object in accordance with a movement of the hand.

Feature 13

A non-transitory computer-readable storage medium storing the program according to claim 12.

According to the embodiment described above, a cross-reality device, a processing device, a generation method, a processing method, a program, and a storage medium can be provided that can more easily prepare a virtual object.

In the specification, "or" shows that "at least one" of items listed in the sentence can be adopted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A cross-reality device, comprising:
an imaging device including a camera and configured to acquire an image;
a display device including a monitor and configured to display a virtual space; and
a processing device including processing circuitry, the processing circuitry being configured to:
  detect fingertips of a hand from the image and a voice input to a microphone,
  generate an object in the virtual space in response to a user operation at least including
    specifying, based on the detected fingertips, at least one selected from the group consisting of a region, a movement, and a dimension, and
    a voice utterance indicating a command, and
  change a position and a size of the generated object in accordance with movements of the detected fingertips,
  wherein the voice utterance specifies a type of operation for the change, and, when changing the position and the size of the generated object, the processing circuitry is configured to specify, based on movements of the detected fingertips, at least one selected from the group consisting of a region, a movement, and a dimension as a parameter of the type of operation and to apply the type of operation using the parameter.

2. The cross-reality device according to claim 1, wherein in a case where a marker exists in a real space is imaged by the camera, the processing circuitry sets a three-dimensional coordinate system in the virtual space based on the marker, and changes the position and the size of the object in the three-dimensional coordinate system.

3. The cross-reality device according to claim 1, wherein the processing circuitry is configured to accept a setting of an attribute indicating a function of the object, and the function is a detection of contact between a prescribed physical object and the object.

4. The cross-reality device according to claim 1, wherein the object is stored in association with data related to a fastening location of an article in a real space.

5. The cross-reality device according to claim 1, wherein the command is inputted by a voice or a hand gesture.

6. The cross-reality device according to claim 1, wherein the processing circuitry is configured to
  display an object with a plurality of commands on the monitor, and
  accept an input of the plurality of commands selected by a user.

7. The cross-reality device according to claim 1, wherein the display device is configured to display the virtual space overlaid on a real space.

8. A non-transitory computer-readable storage medium storing a program, the program causing a computer to:
  detect fingertips of a hand from an image and a voice of a human;
  generate an object in a virtual space in response to a user operation at least including specifying, based on the fingertips, at least one selected from the group consisting of a region, a movement, and a dimension, and
    a voice utterance indicating a command; and
  change a position and a size of the generated object in accordance with movements of the detected fingertips,
  wherein the voice utterance specifies a type of operation for the change, and, when changing the position and the size of the generated object, the computer is caused to specify, based on movements of the detected fingertips, at least one selected from the group consisting of a region, a movement, and a dimension as a parameter of the type of operation and to apply the type of operation using the parameter.

9. A processing device, configured to:
read the program from the storage medium according to claim 8; and
execute the program.

10. An object generation method performed by a first processing device, comprising:
  detecting fingertips of a hand from an image and a voice of a human;
  generating an object in a virtual space in response to a user operation at least including
    specifying, based on the fingertips, at least one selected from the group consisting of a region, a movement, and a dimension, and
    a voice utterance indicating a command; and
  changing a position and a size of the object in accordance with movements of the detected fingertips,
  wherein the voice utterance specifies a type of operation for the change, and, when changing the position and the size of the generated object, the first processing device is configured to specify, based on movements of the detected fingertips, at least one selected from the group consisting of a region, a movement, and a dimension as a parameter of the type of operation and to apply the type of operation using the parameter.

11. The generation method according to claim 10, wherein the first processing device
  detects a marker from the image,
  sets a three-dimensional coordinate system based on the marker, and
  changes the position and the size of the object in the three-dimensional coordinate system.

12. A processing method performed by a second processing device, comprising:
  displaying the object generated by the generation method according to claim 10 on a display device; and
  detecting contact between a prescribed physical object and the object from the image in a case where the prescribed physical object is imaged.

13. The cross-reality device according to claim 3, wherein the attribute indicates a jig region in the virtual space corresponding to a region in a real space into which a tool is not allowed to enter, and
the processing circuitry is configured to determine that the tool enters the jig region based on the image and to output a notification in response to the determination.

14. The cross-reality device according to claim 3, wherein the object includes a guide having a spherical shape in the virtual space, and
the processing circuitry is configured to
  detect contact between the guide and a prescribed real object based on the image and
  update a work state of fastening in response to the detected contact.

15. The cross-reality device according to claim 2, wherein
the marker is disposed on a real article and is captured
   both in a preparation phase in which the object is
   generated and in an actual work phase in which the
   object is used, and
the three-dimensional coordinate system is set based on
   the marker so that a position and a size of the object
   defined in the preparation phase are displayed in the
   actual work phase.

16. The cross-reality device according to claim 1, wherein
the type of operation includes a move operation, and
when the type of operation is the move operation, the
   processing circuitry is configured to apply the type of
   operation so that the movement selected from the group
   is used as a translation amount of the object.

17. The cross-reality device according to claim 1, wherein
the type of operation includes a resize operation, and
when the type of operation is the resize operation, the
   processing circuitry is configured to apply the type of
   operation so that the dimension selected from the group
   is used as a scaling amount of the object.

* * * * *